US012046816B2

(12) United States Patent
Tao et al.

(10) Patent No.: US 12,046,816 B2
(45) Date of Patent: Jul. 23, 2024

(54) RECONFIGURABLE ANTENNA AND NETWORK DEVICE

(71) Applicant: Huawei Technologies Co., Ltd., Shenzhen (CN)

(72) Inventors: Zui Tao, Nanjing (CN); Xiao Zhou, Shanghai (CN); Jie Zhao, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 108 days.

(21) Appl. No.: 17/712,391

(22) Filed: Apr. 4, 2022

(65) Prior Publication Data

US 2022/0328974 A1 Oct. 13, 2022

(30) Foreign Application Priority Data

Apr. 7, 2021 (CN) ........................ 202110372086.0

(51) Int. Cl.
*H01Q 19/10* (2006.01)
*H01Q 3/44* (2006.01)
*H01Q 15/14* (2006.01)

(52) U.S. Cl.
CPC ............. *H01Q 15/148* (2013.01); *H01Q 3/44* (2013.01); *H01Q 19/10* (2013.01); *H01Q 19/108* (2013.01)

(58) Field of Classification Search
CPC .......... H01Q 3/44; H01Q 21/26; H01Q 19/10; H01Q 19/108
See application file for complete search history.

(56) References Cited

U.S. PATENT DOCUMENTS

| | | | | |
|---|---|---|---|---|
| 2016/0352006 | A1* | 12/2016 | Shtrom | H01Q 15/14 |
| 2017/0033471 | A1 | 2/2017 | Huang et al. | |
| 2020/0028276 | A1* | 1/2020 | Watson | H01Q 9/145 |
| 2022/0247088 | A1 | 8/2022 | Tao et al. | |

FOREIGN PATENT DOCUMENTS

| | | | | |
|---|---|---|---|---|
| CN | 104538738 A | | 4/2015 | |
| CN | 110301069 A | * | 10/2019 | H01Q 1/2291 |
| CN | 111769372 A | | 10/2020 | |

* cited by examiner

*Primary Examiner* — Daniel Munoz
(74) *Attorney, Agent, or Firm* — Conley Rose, P.C.

(57) ABSTRACT

A reconfigurable antenna includes a bottom plate, a vertically polarized high-density antenna, and a controllable reflector. The controllable reflector is located between the bottom plate and the vertically polarized high-density antenna, and a projection of the controllable reflector on the bottom plate is at a center of a projection of the vertically polarized high-density antenna on the bottom plate. The controllable reflector includes a switch, and the switch is configured to enable the controllable reflector to be in an operating state or an off state.

20 Claims, 18 Drawing Sheets

RECONFIGURABLE ANTENNA AND NETWORK DEVICE

CROSS-REFERENCE TO RELATED APPLICATIONS

This claims priority to Chinese Patent App. No. 202110372086.0, filed on Apr. 7, 2021, which is incorporated by reference.

TECHNICAL FIELD

This disclosure relates to the field of communications technologies, and in particular, to a reconfigurable antenna, and a network device including the reconfigurable antenna.

BACKGROUND

A wireless local area network usually includes a plurality of wireless access points (APs) that operate at a same frequency. A signal coverage area of a single wireless access point needs to be adjusted correspondingly based on a different use scenario requirement. When adjacent wireless access points are close to each other, the signal coverage area of the single wireless access point needs to be small, to avoid co-channel interference. When adjacent wireless access points are far away from each other, the signal coverage area of the single wireless access point needs to be large, to avoid a signal coverage hole.

The wireless access point may implement switching between beams at different azimuths by using a reconfigurable antenna. However, a beam at a pitch angle may be usually implemented by performing switching between two or more antennas by using a radio frequency switch. The antennas have different maximum gain directions. In such an adjustment manner, there is a high insertion loss, overall antenna performance decreases, and an antenna size is increased.

SUMMARY

This disclosure provides a reconfigurable antenna, to implement a function of switching beams at a pitch angle when there is a small insertion loss. This disclosure further relates to a network device including the reconfigurable antenna. Specific technical solutions are as follows:

According to a first aspect, a reconfigurable antenna includes a bottom plate, a vertically polarized high-density antenna, and a controllable reflector. The controllable reflector is located between the bottom plate and the vertically polarized high-density antenna, and a projection of the controllable reflector on the bottom plate is at a center of a projection of the vertically polarized high-density antenna on the bottom plate; and the controllable reflector includes a switch, and the switch is configured to enable the controllable reflector to be in an operating state or an off state.

The reconfigurable antenna reflects a signal of the vertically polarized high-density antenna by using the bottom plate, to improve overall performance of the antenna. The controllable reflector disposed between the bottom plate and the vertically polarized high-density antenna and located at a central location of the vertically polarized high-density antenna can reflect a beam of the vertically polarized high-density antenna outwards. When the switch of the controllable reflector is opened, the controllable reflector is in the off state. In this case, a pitch angle of the vertically polarized high-density antenna is narrow, and a signal coverage area is small, so that a high-density characteristic can be implemented. However, when the switch of the controllable reflector is closed, the controllable reflector is in the operating state. In this case, because the controllable reflector reflects a beam outwards, the pitch angle of the vertically polarized high-density antenna is widened, and the signal coverage area is correspondingly extended. Compared with a form of switching an antenna by using a radio frequency switch, in a process of adjusting a pitch angle of the reconfigurable antenna, there is a smaller insertion loss, and a size of the reconfigurable antenna is also controlled.

In a possible implementation, the controllable reflector includes a part parallel to a polarization direction of the vertically polarized high-density antenna, a distance D1 between the controllable reflector and the vertically polarized high-density antenna meets a condition: $D1 \leq \frac{1}{4}\lambda$, and $\lambda$ is a wavelength corresponding to an operating frequency band of the vertically polarized high-density antenna.

In this implementation, the part that is of the controllable reflector and that is parallel to the polarization direction of the vertically polarized high-density antenna may reflect more beams in the polarization direction. However, the distance between the controllable reflector and the vertically polarized high-density antenna is set, to control a phase difference between the controllable reflector and the vertically polarized high-density antenna, and improve reflection efficiency of the controllable reflector.

In a possible implementation, in the polarization direction of the vertically polarized high-density antenna, the controllable reflector includes a first end close to the bottom plate, and the first end is electrically connected to the bottom plate.

In this implementation, the controllable reflector and the bottom plate are electrically connected, to extend a distance in which the controllable reflector performs an action on a beam, and further improve reflection efficiency of the controllable reflector.

In a possible implementation, the controllable reflector further includes a second end opposite the first end, and the switch is located closer to the first end than the second end.

In this implementation, the switch is disposed on a side close to the bottom plate, to reduce impact that is on a beam and that exists when the controllable reflector is in the off state, and improve a difference in reflection efficiency of the controllable reflector between the off state and the operating state.

In a possible implementation, a length of the controllable reflector in the polarization direction of the vertically polarized high-density antenna is a first length L1, and the first length L1 meets a condition: $\frac{1}{4}\lambda \leqslant L1 \leqslant \lambda$.

In this implementation, the length of the controllable reflector is controlled, to ensure a distance in which the controllable reflector performs an action on a beam, and improve reflection efficiency of the controllable reflector.

In a possible implementation, the controllable reflector is further provided with an inductor structure, the inductor structure and the switch are connected in parallel, the inductor structure and the switch form a resonator, and a resonance frequency of the resonator falls within the operating frequency band of the vertically polarized high-density antenna.

In this implementation, the inductor structure is disposed, to form the resonator in an operating frequency band of the switch, form large impedance when the switch is opened, and improve an isolation degree existing when the switch in an opened state.

In a possible implementation, there is one controllable reflector; or there are a plurality of controllable reflectors, and the plurality of controllable reflectors are evenly distributed in a circle.

In this implementation, when there is one controllable reflector, the controllable reflector may be located at a central location of the vertically polarized high-density antenna, so that a radiation pattern of the reconfigurable antenna is more evenly distributed; or when there are a plurality of controllable reflectors, the plurality of controllable reflectors are evenly distributed, to increase a range in which the controllable reflector performs an action on a beam, and further increase the pitch angle of the reconfigurable antenna.

In a possible implementation, when the controllable reflector is in the off state, an angle corresponding to a maximum gain of a pitch angle of the reconfigurable antenna is 37.5 degrees; or when the controllable reflector is in the operating state, an angle corresponding to a maximum gain of a pitch angle of the reconfigurable antenna is 70 degrees.

In this implementation, when the angle corresponding to the maximum gain of the pitch angle of the reconfigurable antenna is controlled to be 37.5 degrees, the reconfigurable antenna may operate in a high density mode. When the angle corresponding to the maximum gain of the pitch angle of the reconfigurable antenna is controlled to be 70 degrees, the reconfigurable antenna may operate in an omnidirectional mode or a directional mode.

In a possible implementation, when the vertically polarized high-density antenna is in a directional mode, a maximum gain that is of the reconfigurable antenna and that exists when the controllable reflector is in the operating state is 1 decibel to 2.5 decibels greater than a maximum gain that is of the reconfigurable antenna and that exists when the controllable reflector is in the off state.

In this implementation, the vertically polarized high-density antenna may be set to be in the directional mode, to implement a larger signal coverage area in a preset direction. In addition, under the action of the controllable reflector, the maximum gain of the reconfigurable antenna be further improved in the directional mode, to improve antenna performance of the reconfigurable antenna.

In a possible implementation, the vertically polarized high-density antenna includes N dipoles and a feeding part, N is an integer greater than or equal to 3, each dipole is connected to the feeding part, and the dipoles are distributed in a circle.

In this implementation, the N dipoles distributed in the circle form a radiation element of the vertically polarized high-density antenna, and signals are fed into the dipoles respectively through the feeding part, to form a low side lobe characteristic in the polarization direction of the vertically polarized high-density antenna, and suppress co-channel interference.

In a possible implementation, the vertically polarized high-density antenna is a dipole antenna, each dipole includes a pair of an upper dipole and a lower dipole, and the feeding part separately feeds each upper dipole and feeds each lower dipole.

In a possible implementation, the vertically polarized high-density antenna is a monopole antenna, the vertically polarized high-density antenna is further provided with a grounding part, and the grounding part is located between each dipole and the bottom plate.

In the foregoing two implementations, the vertically polarized high-density antenna has different constitution forms, and the low side lobe characteristic in the polarization direction can be implemented.

In a possible implementation, a length direction of each dipole points to a center of the vertically polarized high-density antenna, and a length of each dipole in the direction meets a condition: $\frac{1}{4}\lambda \leq L2 \leq \frac{3}{4}\lambda$.

In this implementation, the length direction of each dipole points to the center of the vertically polarized high-density antenna, so that a radiation pattern of the vertically polarized high-density antenna can be more even. However, the length of each dipole is limited, to improve radiation efficiency of each dipole.

In a possible implementation, the feeding part is located at a center of each dipole.

In this implementation, a location of the feeding part is set, to reduce an insertion loss of the vertically polarized high-density antenna.

In a possible implementation, the feeding part includes a power splitter, an impedance conversion line, and an ohm transmission line.

In this implementation, the feeding part feeds a signal through the power splitter, and feeds the signal into each dipole through the impedance conversion line and the ohm transmission line, to implement a feeding function.

In a possible implementation, the vertically polarized high-density antenna further includes a circuit board, and each dipole and the feeding part are disposed on an outer surface of the circuit board.

In a possible implementation, the vertically polarized high-density antenna is further provided with a plurality of azimuth reflectors, each azimuth reflector is also distributed in a circle, a length direction of each azimuth reflector is parallel to the polarization direction, and there is a maximum of one azimuth reflector between two adjacent dipoles.

The azimuth reflector is disposed, so that the radiation pattern of the vertically polarized high-density antenna is even, to improve a radiation capability of the vertically polarized high-density antenna in a horizontal direction.

In a possible implementation, each azimuth reflector is also provided with a switch.

In this implementation, the switch of the azimuth reflector is controlled, to adjust a horizontal radiation angle of the vertically polarized high-density antenna, so that the vertically polarized high-density antenna is switched between the directional mode and the omnidirectional mode.

In a possible implementation, each switch of each azimuth reflector is located at a central location of the azimuth reflector.

In this implementation, a location of the switch on the azimuth reflector is set, to reduce impact that is on a beam and that exists when the azimuth reflector is in an off state, and improve a reflection efficiency difference of the azimuth reflector between the off state and an operating state.

According to a second aspect, a network device includes a radio frequency circuit, a control circuit, and the reconfigurable antenna according to the first aspect. The radio frequency circuit is electrically connected to the reconfigurable antenna, and a switch is controlled by the control circuit.

Technical effects achieved in the second aspect are similar to technical effects achieved by the corresponding technical means in the first aspect, and details are not described herein again.

DETAILED DESCRIPTION

Figure 1:
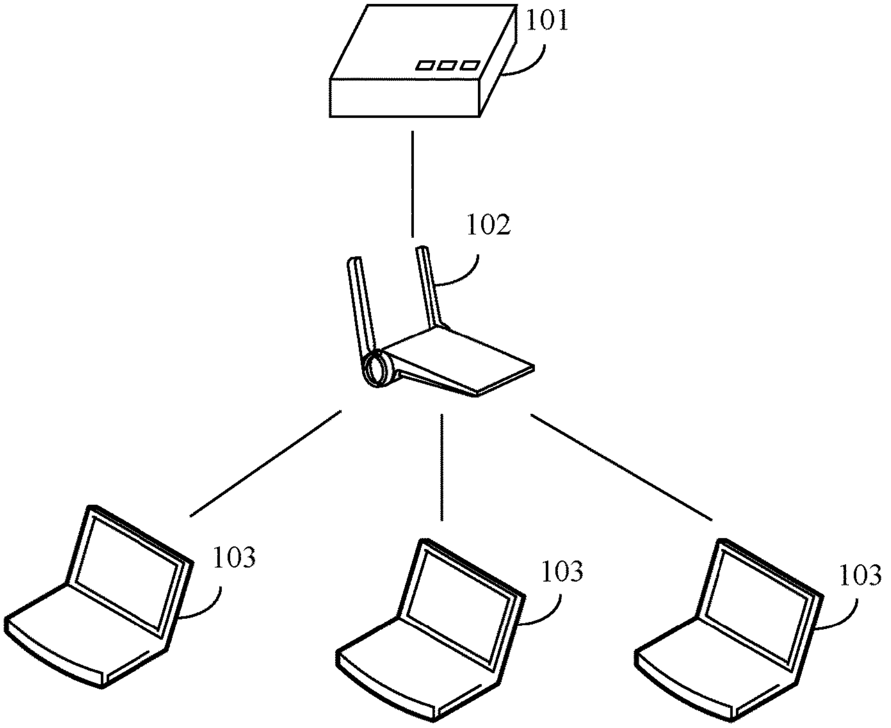
FIG. 1 is a diagram of a scenario of a network device according to an embodiment.

FIG. 1 is a diagram of a scenario of a network device according to an embodiment. As shown in FIG. 1, the scenario includes a controller 101, an AP 102, and a plurality of terminals 103. The controller 101 may manage and configure the access point 102, and forward user data. The access point 102 is configured to provide a wireless access service for a plurality of connected terminals 103. The network device may be a base station, a router, a switch, or the like, and works as the access point 102. The plurality of terminals 103 may be products such as a mobile phone, a computer, and a smart home appliance. In addition, only three terminals are used as an example for description in FIG. 1, and do not constitute a limitation on a quantity of terminals in the scenario provided in this embodiment.

Figure 2:
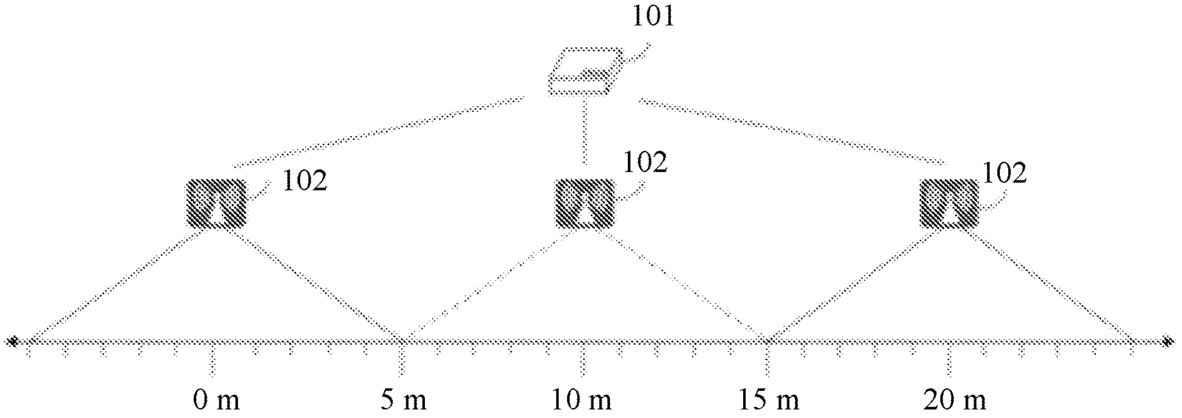
FIG. 2 is a schematic diagram of a scenario in which a plurality of network devices form an array according to an embodiment.

FIG. 2 is a diagram of a scenario in which a plurality of network devices are deployed according. A controller 101 may be configured to: centrally manage and configure a plurality of access points 102, and forward user data. The plurality of access points 102 are usually disposed at a height of 3 meters to 5 meters (m). A radius of a coverage cell may be different based on a use requirement, and may be set to be less than 10 m or fall within a range from 10 m to 20 m, or may even be greater than 20 m.

For a use scenario requirement, a communication capacity and a quantity of channels are usually considered. When there is a large quantity of users per unit area, to ensure the communication capacity, it may be set that the access point 102 performs signal coverage in a large-angle omnidirectional mode (for example, a coverage radius of the access point 102 falls within the range from 10 m and 20 m). However, there is a limited quantity of channels of the single access point 102. In this case, a distance between access points 102 may be set to be reduced, and signal coverage is performed in a small-angle high density mode (for example, a coverage radius of the access point 102 is less than 10 m). However, in a scenario in which there is a small quantity of users per unit area and there is a large cell area, a distance between access points 102 may alternatively be set to be large, and signal coverage is performed in a super-large-angle directional mode (for example, a coverage radius of the access point 102 is greater than 20 m).

Figure 3:
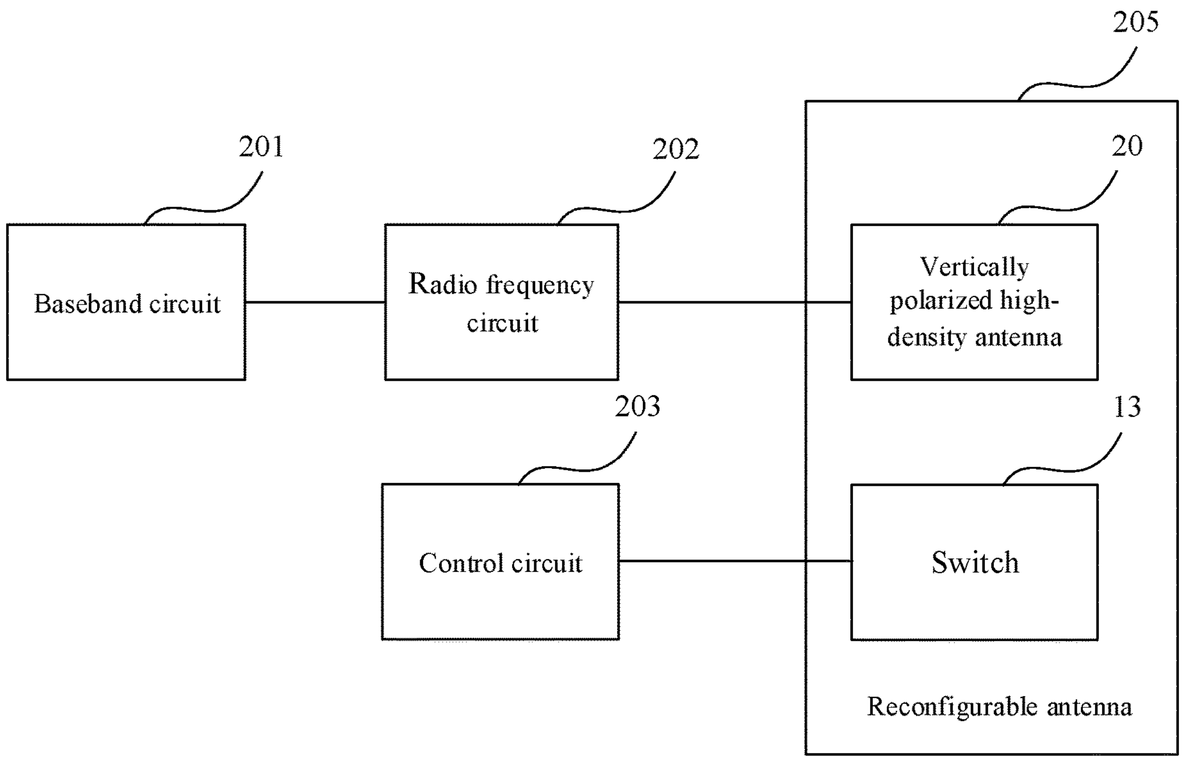
FIG. 3 is a schematic diagram of a structure of a network device according to an embodiment.

FIG. 3 is a schematic diagram of a structure of a network device according to an embodiment. For example, the access point 102 in FIG. 1 and FIG. 2 may be implemented by using the network device shown in FIG. 3. Refer to FIG. 3. The network device includes a baseband circuit 201, a radio frequency circuit 202, a control circuit 203, and a reconfigurable antenna 205.

The baseband circuit 201 is configured to process a received radio signal or a to-be-sent radio signal.

The reconfigurable antenna 205 is a reconfigurable antenna provided. The reconfigurable antenna 205 includes a vertically polarized high-density antenna 20 and a switch 13. For descriptions of the vertically polarized high-density antenna 20 and the switch 13, refer to related descriptions in subsequent embodiments.

The radio frequency circuit 202 is connected between the vertically polarized high-density antenna 20 of the reconfigurable antenna 205 and the baseband circuit 201, and is configured to cooperate with the reconfigurable antenna 205 to receive and send a radio signal.

The control circuit 203 is electrically connected to the switch 13 of the reconfigurable antenna 205, and is configured to control an operating mode of the reconfigurable antenna 205, so that a radiation angle of the reconfigurable antenna 205 can be switched, to change a signal coverage area, and adapt to different use scenario requirements. The control circuit 203 may be implemented by using a complex programmable logical device (CPLD), or in a general purpose input/output (GPIO) manner.

The following describes the reconfigurable antenna 205 provided in this embodiment.

Figure 4:
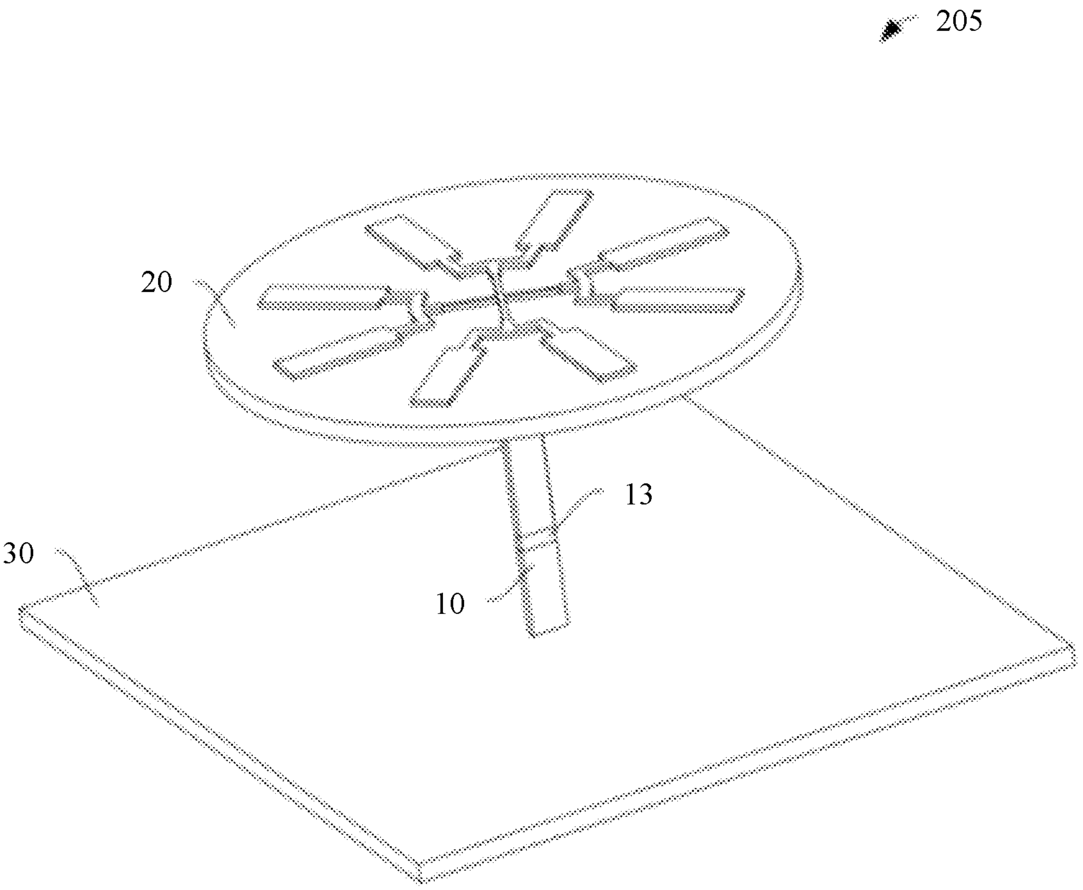
FIG. 4 is a schematic diagram of a structure of a reconfigurable antenna according to an embodiment.

FIG. 4 is a schematic diagram of a structure of a reconfigurable antenna 205 according to an embodiment. As shown in FIG. 4, the reconfigurable antenna 205 may include a bottom plate 30, a vertically polarized high-density antenna 20, and a controllable reflector 10. The vertically polarized high-density antenna 20 serves as a radiation body of the reconfigurable antenna 205, and is configured to separately radiate to two opposite sides in a polarization direction of the vertically polarized high-density antenna 20. The bottom plate 30 is conductive, and is disposed in the polarization direction of the vertically polarized high-density antenna 20. The bottom plate 30 and the vertically polarized high-density antenna 20 are spaced from each other. The bottom plate 30 may reflect a signal beam emitted by the vertically polarized high-density antenna 20, so that after a signal beam emitted by the vertically polarized high-density antenna 20 toward one side is reflected, the signal beam converges with a signal beam on the other side, and propagates toward a same side of the vertically polarized high-density antenna 20. Usually, a direction of the same side is a downward propagation direction of a network device. In other words, the signal beam emitted by the vertically polarized high-density antenna 20 propagates toward the same side in the polarization direction of the vertically polarized high-density antenna 20 under a reflection action of the bottom plate 30, to improve signal strength and achieve high density.

It can be understood that the vertically polarized high-density antenna 20 is a linearly polarized antenna, and the polarization direction of the vertically polarized high-density antenna 20 is a linear direction. In addition, because the bottom plate 30 is disposed on one side in the polarization direction of the vertically polarized high-density antenna 20 and spaced from the vertically polarized high-density antenna 20, a pitch angle of the vertically polarized high-density antenna 20 is small, and an azimuth coverage area is also small, to achieve vertical polarization. In the reconfigurable antenna 205, the vertically polarized high-density antenna 20 may implement a high density mode of the reconfigurable antenna 205, to implement small-range large-capacity communication.

The controllable reflector 10 is located between the bottom plate 30 and the vertically polarized high-density antenna 20. In the schematic diagram of FIG. 4, there is one controllable reflector 10, and a length direction of the controllable reflector 10 is also disposed in the polarization direction of the vertically polarized high-density antenna 20. In other words, an entirety of the controllable reflector 10 is disposed parallel to the polarization direction of the vertically polarized high-density antenna 20. The controllable reflector 10 includes a switch 13, and the switch 13 is configured to implement switching of the controllable reflector 10 between an off state and an operating state. It can be understood that, as described above, a control circuit 203 controls an operating mode of the reconfigurable antenna 205. In other words, the operating mode of the reconfigurable antenna 205 may be implemented by that the control circuit 203 electrically connecting and controlling the switch 13.

Figure 5:
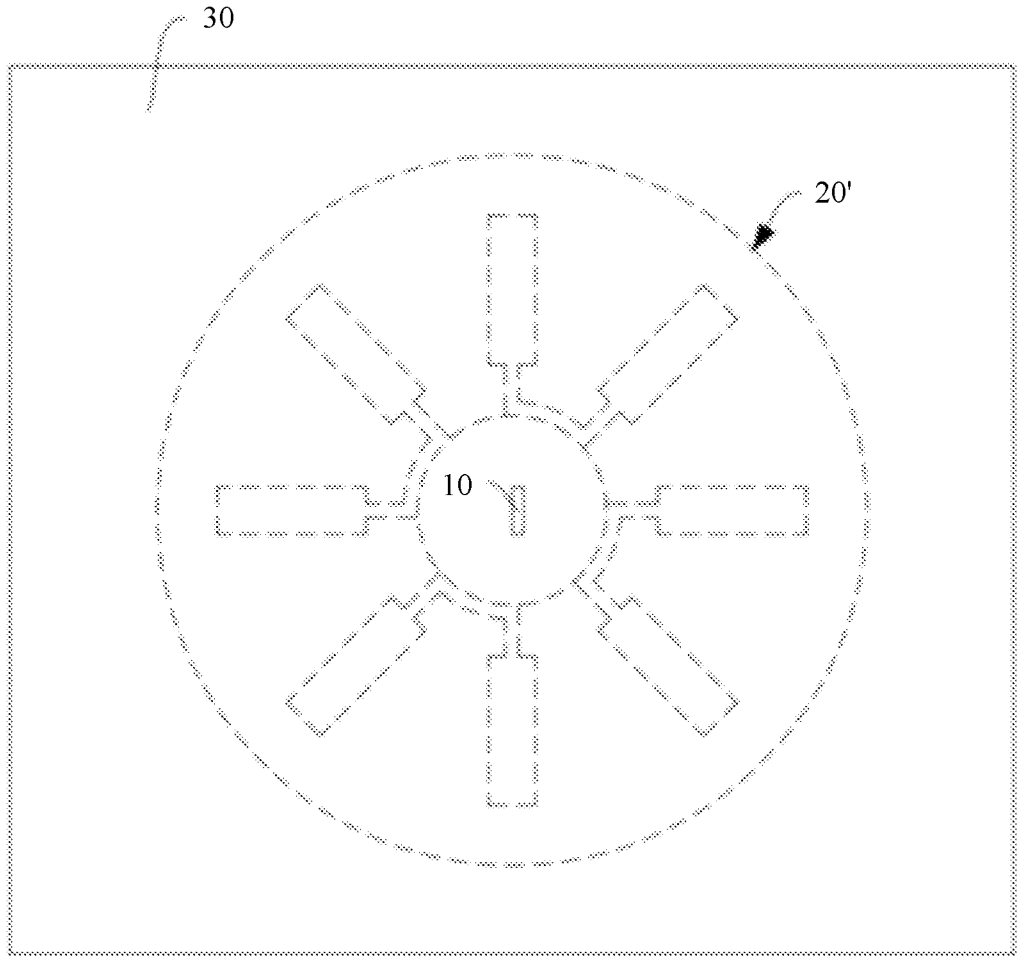
FIG. 5 is a schematic diagram of a layout of a plane of a reconfigurable antenna according to an embodiment.

Refer to FIG. 5. In the schematic diagram of FIG. 5, a projection 20' of the vertically polarized high-density antenna 20 on the bottom plate 30 in the polarization direction of the vertically polarized high-density antenna 20 is in an annular shape (a case in which a feeding network is located at a phase center is not considered), and has an inner circle and an outer circle. A projection of the controllable reflector 10 on the bottom plate 30 in the polarization direction is located at a center of the projection 20' in the annular shape. In some embodiments, the controllable reflector 10 may alternatively properly offset relative to the center of the annular shape, but in this case, the reflector 10 still falls within the inner circle of the projection 20' in the annular shape. In some other embodiments, the projection 20' of the vertically polarized high-density antenna 20 on the bottom plate 30 in the polarization direction of the vertically polarized high-density antenna 20 may alternatively be in an elliptical annular shape or approximately in any hollow shape such as a shape of two concentric squares. In this case, the controllable reflector 10 may be located at a center of the hollow shape or offset relative to a central location, and remain within an inner circle of the hollow shape.

Under the action of the switch 13, the controllable reflector 10 can be switched between the off state and the operating state. When the switch 13 is opened, the controllable reflector 10 is in the off state. In this case, the controllable reflector 10 does not affect a beam of the reconfigurable antenna 205, and a signal coverage area of the reconfigurable antenna 205 is represented as a coverage area of the vertically polarized high-density antenna 20. As mentioned above, the coverage area of the vertically polarized high-density antenna 20 is small. In this case, the operating state of the reconfigurable antenna 205 is in a high density mode.

When the switch 13 is closed, the reflector 10 is in the operating state. In this case, the controllable reflector 10 reflects the beam emitted by the vertically polarized high-density antenna 20. Specifically, because the controllable reflector 10 is located at a central location of the vertically polarized high-density antenna 20, the controllable reflector 10 may reflect the signal beam emitted by the vertically polarized high-density antenna 20 outwards in a direction parallel to the bottom plate 30. To be specific, in a horizontal direction of the vertically polarized high-density antenna 20, the controllable reflector 10 at the central location reflects the signal beam, so that a pitch angle of the vertically polarized high-density antenna 20 is increased, to further extend the coverage area of the vertically polarized high-density antenna 20. In other words, an action radius of the vertically polarized high-density antenna 20 is increased. In this case, the operating state of the reconfigurable antenna 205 may be the foregoing omnidirectional mode or directional mode, and is specifically determined based on a shape of a radiation pattern of the vertically polarized high-density antenna 20.

Figure 6A:
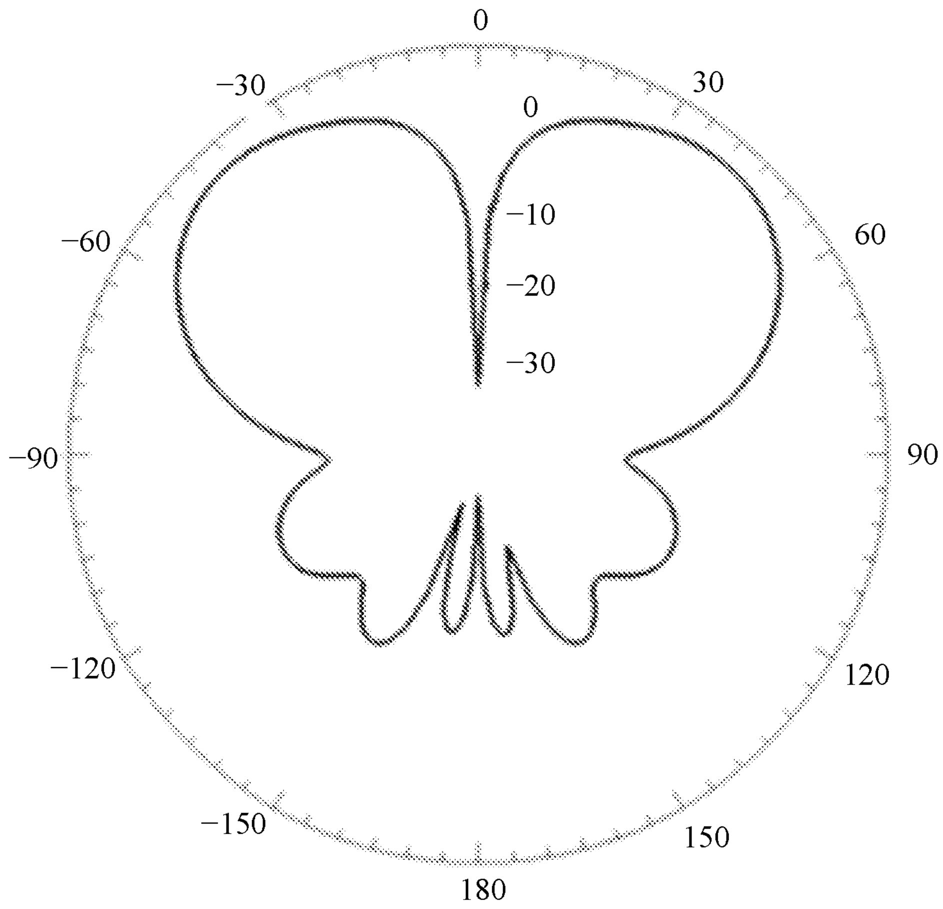
FIG. 6*a* and FIG. 6*b* are schematic diagrams of pitch angle simulation results of a reconfigurable antenna in different operating modes according to an embodiment.
Figure 6B:
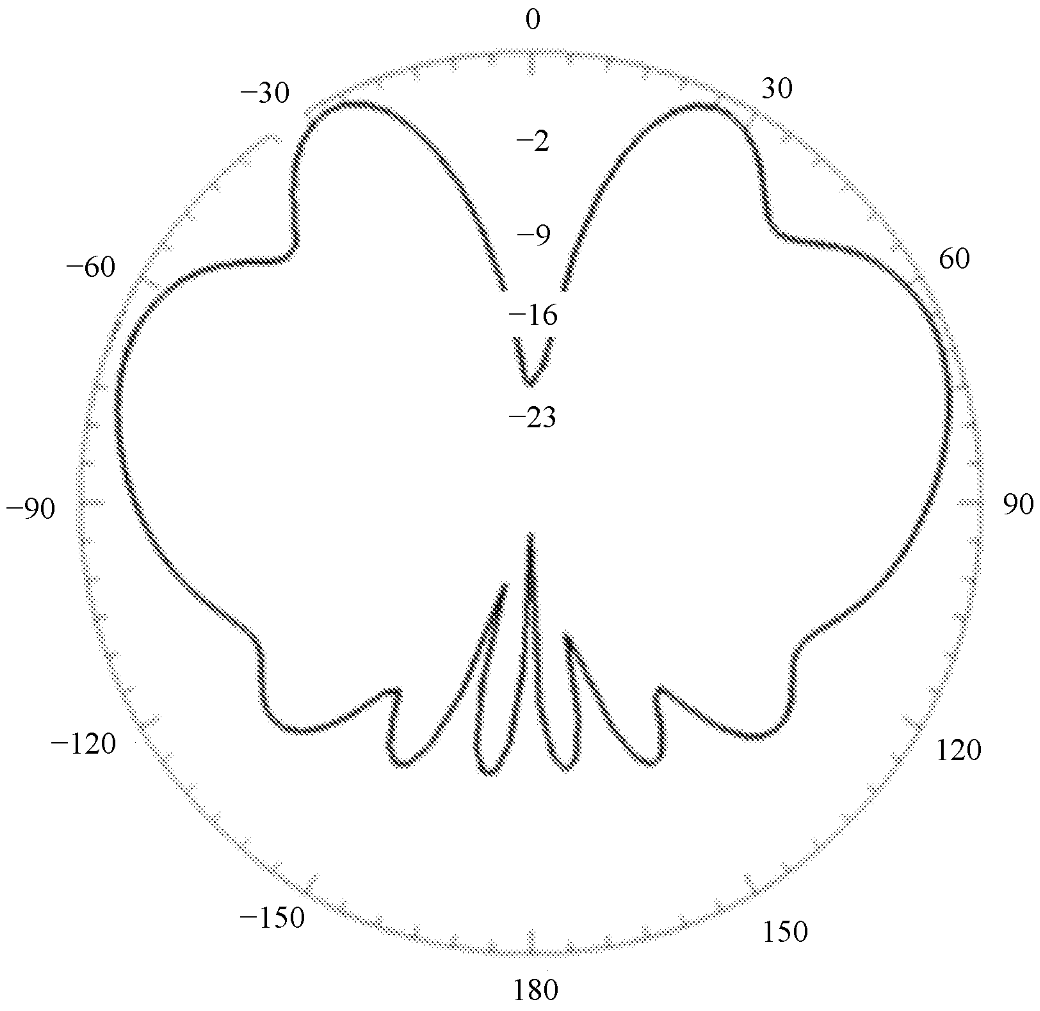

FIG. 6*a* and FIG. 6*b* respectively show pitch angle simulation results of a reconfigurable antenna 205 that exist when a controllable reflector 10 is in different states. FIG. 6*a* shows a simulation result existing when the controllable reflector 10 is in the off state. It can be learned that, under the action of the vertically polarized high-density antenna 20, an angle corresponding to a maximum gain of a pitch angle of the reconfigurable antenna 205 is 37.5 degrees. In other words, when the reconfigurable antenna 205 operates in the high density mode, a pitch angle of the reconfigurable antenna 205 is approximately 75 degrees. FIG. 6*b* shows a simulation result existing when the controllable reflector 10 is in the operating state. It can be learned that, under the action of the controllable reflector 10, the angle corresponding to a maximum gain of a pitch angle of the reconfigurable antenna 205 is extended to 70 degrees. In other words, when the reconfigurable antenna 205 operates in the omnidirectional mode or the directional mode, the pitch angle of the reconfigurable antenna 205 is approximately 140 degrees.

Figure 6C:
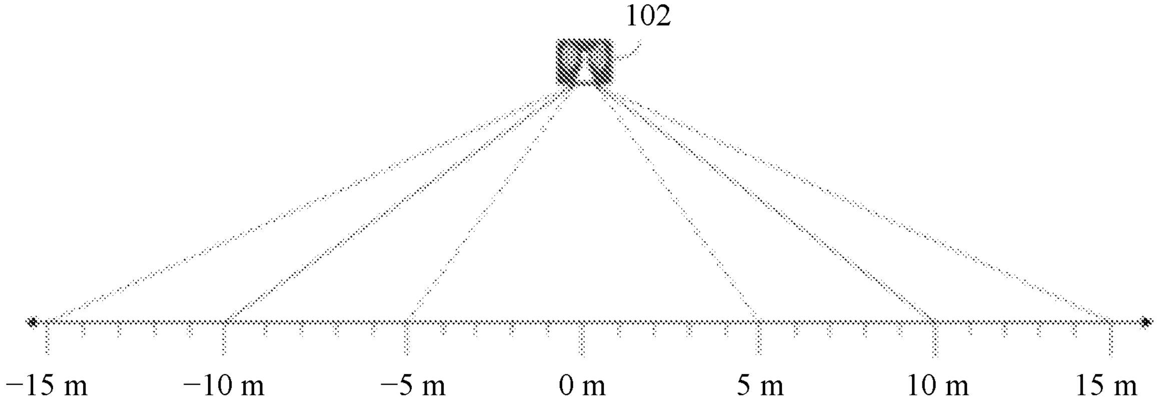
FIG. 6*c* is a schematic diagram of signal coverage areas of a reconfigurable antenna in different operating modes according to an embodiment.

With reference to the schematic diagram of FIG. 6*c*, a height of 3 m is still used for illustration. In a possible implementation, when the vertically polarized high-density antenna 20 in the reconfigurable antenna 205 operates in the high density mode, the signal coverage area of the reconfigurable antenna 205 is shown by dotted lines in FIG. 6*c*, and signal coverage may be implemented in a range with a radius of 5 m. However, when the vertically polarized high-density antenna 20 in the reconfigurable antenna 205 operates in the omnidirectional mode, the signal coverage area of the reconfigurable antenna 205 is shown by a straight line in FIG. 6*c*, and signal coverage may be implemented in a range with a radius of 10 m.

It can be learned that, under the action of the controllable reflector 10, the pitch angle of the reconfigurable antenna 205 may be adjusted in a large range. In addition, compared with a pitch angle adjustment manner in which a plurality of antennas are combined and a radio frequency switch chooses to perform switching, in this disclosure, an insertion loss of the reconfigurable antenna 205 is smaller, and antenna operating efficiency is improved. In addition, the pitch angle of the reconfigurable antenna 205 can be adjusted in a large range only by disposing the vertically polarized high-density antenna 20. Compared with a structure in which radio frequency combination is performed on a plurality of antennas, the reconfigurable antenna 205 has a smaller overall size, and further facilitates miniaturization and cost control of the network device.

Figure 7:
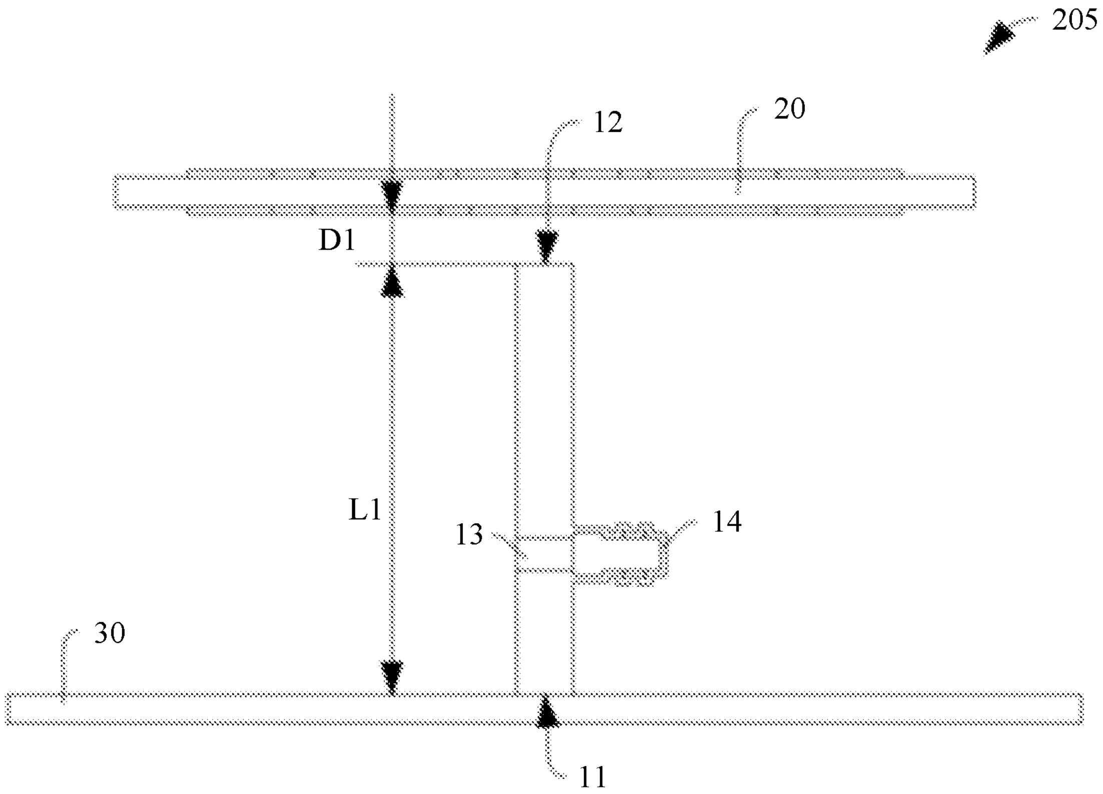
FIG. 7 is a schematic diagram of a structure of a side surface of a reconfigurable antenna according to an embodiment.

FIG. 7 is a side view of an embodiment of a reconfigurable antenna 205. In this embodiment, the controllable reflector 10 is in a strip shape, and is located at a center of the vertically polarized high-density antenna 20, and the length direction of the controllable reflector 10 is disposed parallel to the polarization direction of the vertically polarized high-density antenna 20. Because the signal beams emitted by the vertically polarized high-density antenna 20 also propagate approximately parallel to the polarization direction of the vertically polarized high-density antenna 20, the controllable reflector 10 is disposed parallel to the polarization direction to reflect more beams. However, when the controllable reflector 10 is disposed at the central location of the vertically polarized high-density antenna 20, reflection effects of the controllable reflector 10 on signal beams in a range of 360 degrees in the horizontal direction tend to be consistent, so that a radiation pattern of the reconfigurable antenna 205 is distributed more evenly.

In an embodiment, it is further set that the controllable reflector 10 has a first length L1 in the polarization direction, and that the first length L1 meets a condition: $\frac{1}{4}\lambda \leqslant L1 \leqslant \lambda$. Further, a distance in which the controllable reflector 10 performs a reflection action on a signal beam is ensured, and reflection efficiency of the controllable reflector 10 is improved.

In this embodiment, the controllable reflector 10 includes a first end 11 and a second end 12 that are opposite in the length direction of the controllable reflector 10, the first end 11 is located on a side close to the bottom plate 30, and the second end 12 is located on a side close to the vertically polarized high-density antenna 20. The second end 12 of the controllable reflector 10 and the vertically polarized high-density antenna 20 are disposed by being spaced from each other, there is a first spacing distance D1 between second end 12 and the vertically polarized high-density antenna 20, the first spacing distance D1 further meets the following condition: $D1 \leq \frac{1}{4}\lambda$, and λ is a wavelength corresponding to an operating frequency band of the vertically polarized high-density antenna 20. Therefore, a phase difference may be formed between the controllable reflector 10 and the vertically polarized high-density antenna 20, to improve reflection efficiency of the controllable reflector 10.

On one side of the first end 11, the first end 11 is in contact with the bottom plate 30 in a fixed manner. In other words, the first end 11 and the bottom plate 30 are electrically connected. In this case, the bottom plate 30 is used as a reflection surface of the vertically polarized high-density antenna 20, and the distance in which the controllable reflector 10 performs an action on the signal beam is extended through an electrical connection between the bottom plate 30 and the controllable reflector 10, to further improve efficiency in reflection performed by the controllable reflector 10 on the signal beam, and further increase the pitch angle of the reconfigurable antenna 205.

The switch 13 is located between the first end 11 and the second end 12, and the switch 13 is located at a location closer to the first end 11 than the second end 12. In other words, the switch 13 is located on the side close to the bottom plate 30, to reduce impact that is on the signal beam and that exists when the controllable reflector 10 is in the off state, provide a larger difference in reflection efficiency of the controllable reflector 10 between the operating state and the off state, and provide a larger pitch angle change amount of the reconfigurable antenna 205.

In the embodiment in FIG. 7, the controllable reflector 10 is further provided with an inductor structure 14. The inductor structure 14 and the switch 13 are connected in parallel, and form a resonator. A resonance frequency of the resonator falls within the operating frequency band of the vertically polarized high-density antenna 20. The resonator may form large impedance when the switch 13 is opened, to improve an isolation degree that is of the switch 13 and that exists when the switch 13 is in an opened state.

Figure 8:
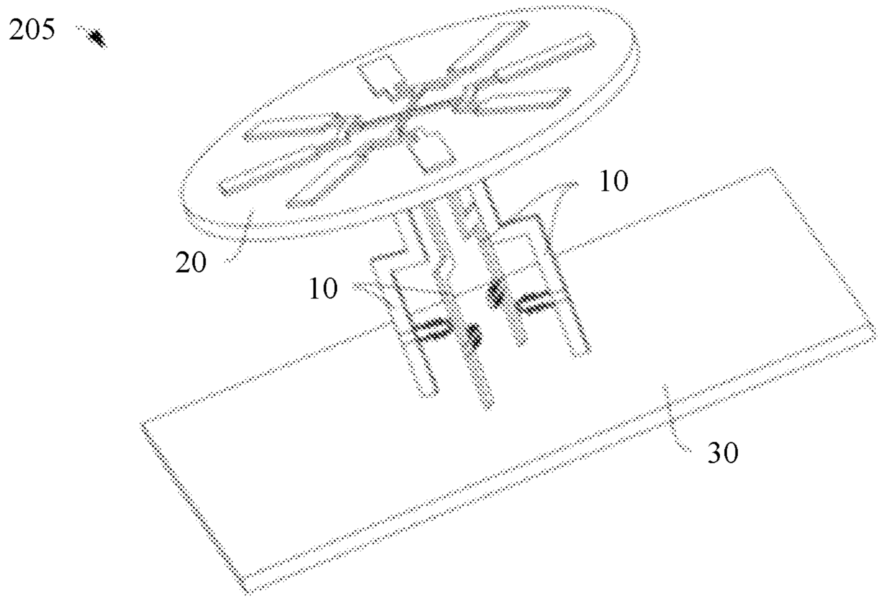
FIG. 8 is a schematic diagram of a structure of another reconfigurable antenna according to an embodiment.
Figure 9:
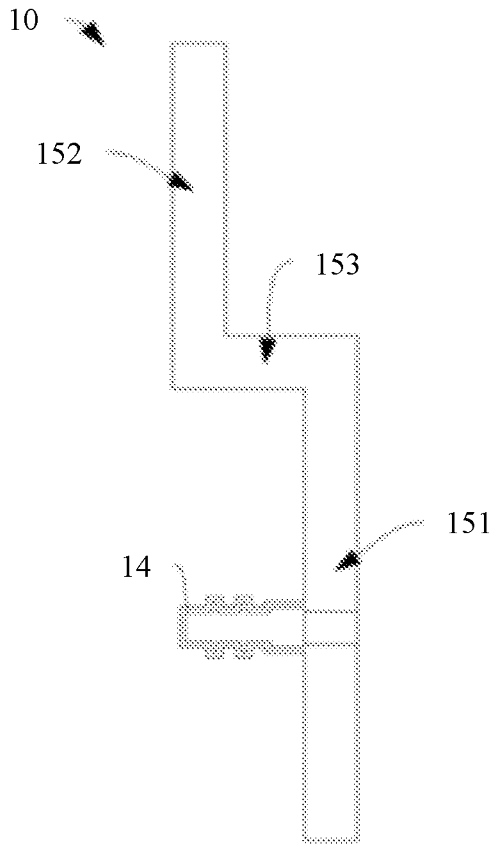
FIG. 9 is a schematic diagram of a structure of a side surface of a single controllable reflector of another reconfigurable antenna according to an embodiment.

FIG. 8 shows a structure of another embodiment of a reconfigurable antenna 205. In this embodiment, there are four controllable reflectors 10, and the four controllable reflectors 10 are evenly distributed in a circle, and are all separately disposed by offsetting relative to the center of the vertically polarized high-density antenna 20. Referring to FIG. 9, each controllable reflector 10 includes a first section 151 and a second section 152 that are disposed parallel to the polarization direction, and a connection section 153 connected between the first section 151 and the second section 152.

In this embodiment, a plurality of controllable reflectors 10 are disposed, to extend an action range of the controllable reflector 10 on the signal beam, and further extend the pitch angle of the reconfigurable antenna 205. However, the first section 151 and the second section 152 are disposed, to ensure the distance in which the controllable reflector 10 performs an action on the signal beam, and improves reflection efficiency of the controllable reflector 10.

Figure 10:
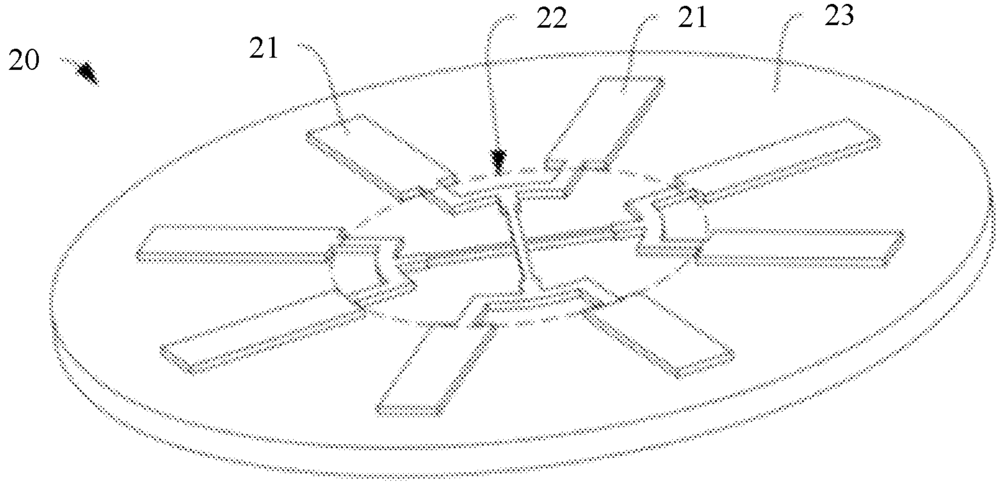
FIG. 10 is a schematic diagram of a structure of a vertically polarized high-density antenna of a reconfigurable antenna according to an embodiment.

FIG. 10 shows a possible structure of a vertically polarized high-density antenna 20. In the schematic diagram of FIG. 10, the vertically polarized high-density antenna 20 includes N dipoles 21, a feeding part 22, and a circuit board 23. The circuit board 23 may be a printed circuit board (PCB). A quantity N of dipoles 21 is an integer greater than or equal to 3. In FIG. 10, that N is 8 is used as an example for description, but does not constitute a limitation on the quantity of dipoles 21 of the vertically polarized high-density antenna 20. The N dipoles 21 and the feeding part 22 are all located on the circuit board 23, and the N dipoles 21 are all connected to the feeding part 22.

As shown in FIG. 10, the N dipoles 21 may be distributed and arranged in a circle whose circle center is an antenna phase center. Optionally, the dipoles 21 may be arranged in the circle at equal intervals. In other words, an included angle between connection lines between the antenna phase center and every two adjacent dipoles 21 is 360/N degrees. A single dipole 21 may be constructed as a strip rectangle, and a length direction of the dipole 21 may point to a center of an annular shape. In an embodiment, a length of the single dipole 21 in this direction meets a condition: $\frac{1}{4}\lambda \leqslant L2 \leqslant \frac{3}{4}\lambda$ (refer to FIG. 12). A length direction of each dipole 21 points to a center of the vertically polarized high-density antenna, so that the radiation pattern of the vertically polarized high-density antenna can be distributed more evenly. However, the length of each dipole 21 is limited, to improve radiation efficiency of each dipole 21.

As mentioned above, the N dipoles 21 may further enclose an elliptical or rectangular annular shape. The power feeding part 22 is located inside the annular shape enclosed by the dipoles 21, so that an insertion loss from the feeding part 22 to each dipole 21 is smaller. When the quantity N of dipoles 21 is an even number, the N dipoles 21 may include a plurality of dipole pairs, and two dipoles 21 in each dipole pair are centrally symmetrical with respect to the antenna phase center. For example, when N is 8, the included angle between connection lines between the antenna phase center and every two adjacent dipoles 21 is 45 degrees. The eight dipoles 21 may be divided into four dipole pairs, and two dipoles 21 in each dipole pair are centrally symmetrical with respect to the antenna phase center. Certainly, the dipoles 21 may be arranged at unequal intervals. For example, it is assumed that an included angle between connection lines between the antenna phase center and two adjacent dipoles 21 connected to two ends of a same transmission line in the feeding part 22 is a first included angle, an included angle between connection lines between the antenna phase center and two adjacent dipoles 21 connected to different transmission lines is a second included angle, and the first included angle and the second included angle may be different.

In addition, the N dipoles 21 and the feeding part 22 may all be printed on a surface of the circuit board 23. Based on different feeding parts 22 and different N dipoles 21, the feeding part 22 and the N dipoles 21 may be located on an upper surface 231 of the circuit board 23, may be located on a lower surface 232 of the circuit board 23, or may be located on both an upper surface 231 and a lower surface 52.

It can be understood that the N dipoles 21 and feeding parts 22 that are correspondingly connected to the N dipoles 21 may all be located on a same outer surface of the circuit board 23. However, in some other embodiments, the vertically polarized high-density antenna 20 may alternatively be in an antenna form of a sheet metal structure. In this case, each dipole 21 is of a metal structure and has specific rigidity and strength. In this form, the circuit board 23 may be omitted.

Figure 11:
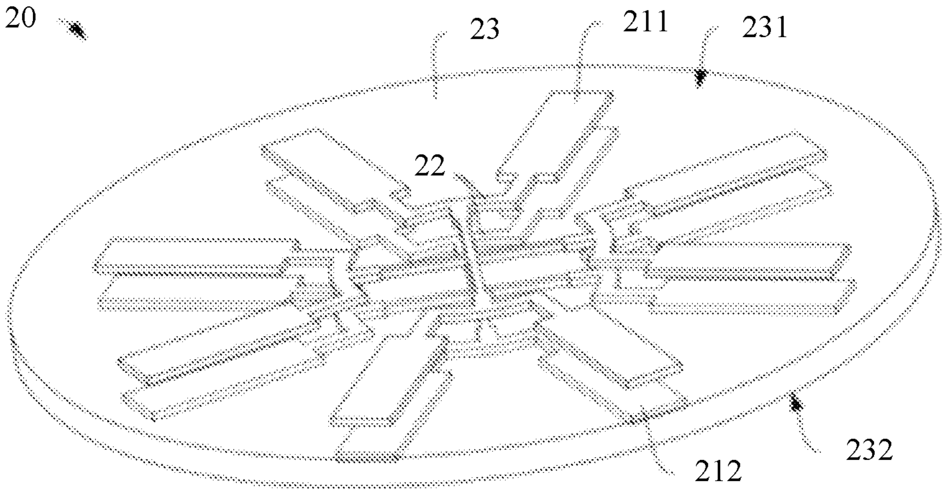
FIG. 11 is a schematic diagram of a structure in which a vertically polarized high-density antenna is a dipole antenna according to an embodiment.

The dipole 21 in the vertically polarized high-density antenna 20 may be a dipole element or a monopole element, and correspondingly, the vertically polarized high-density antenna 20 is a dipole antenna or a monopole antenna. The feeding part 22 may be disposed differently based on different forms of the dipole 21. FIG. 11 shows a structure in which a vertically polarized high-density antenna 20 is a dipole antenna. In this structure, the dipole 21 includes an upper dipole 211 and a lower dipole 212, the upper dipole 211 is located on the upper surface 231 of the circuit board 23, and the lower dipole 212 is located on the lower surface 232 of the circuit board 23.

Figure 12:
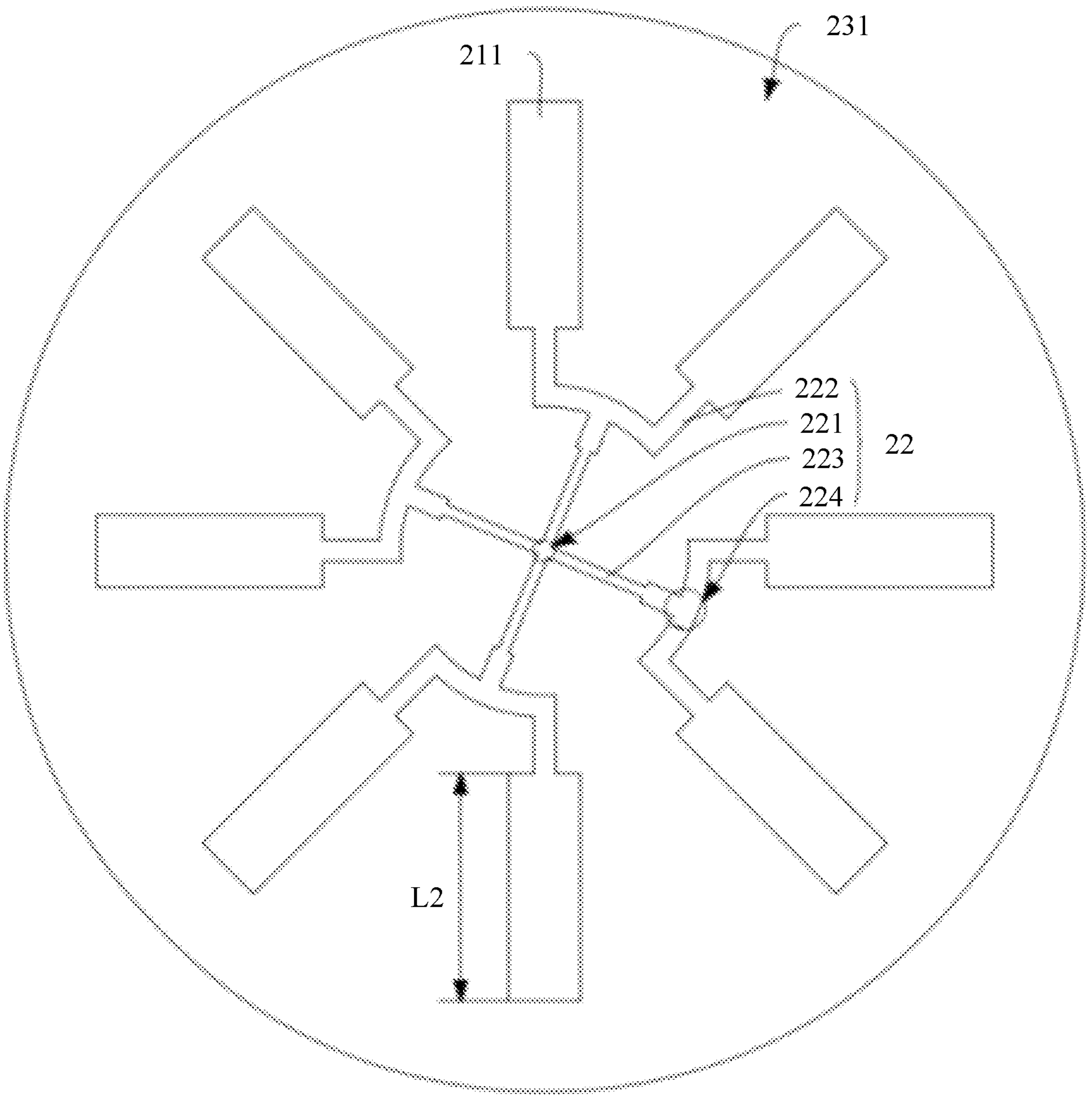
FIG. 12 is a schematic diagram of a plane that is of an upper part and that exists when a vertically polarized high-density antenna is a dipole antenna according to an embodiment.
Figure 13:
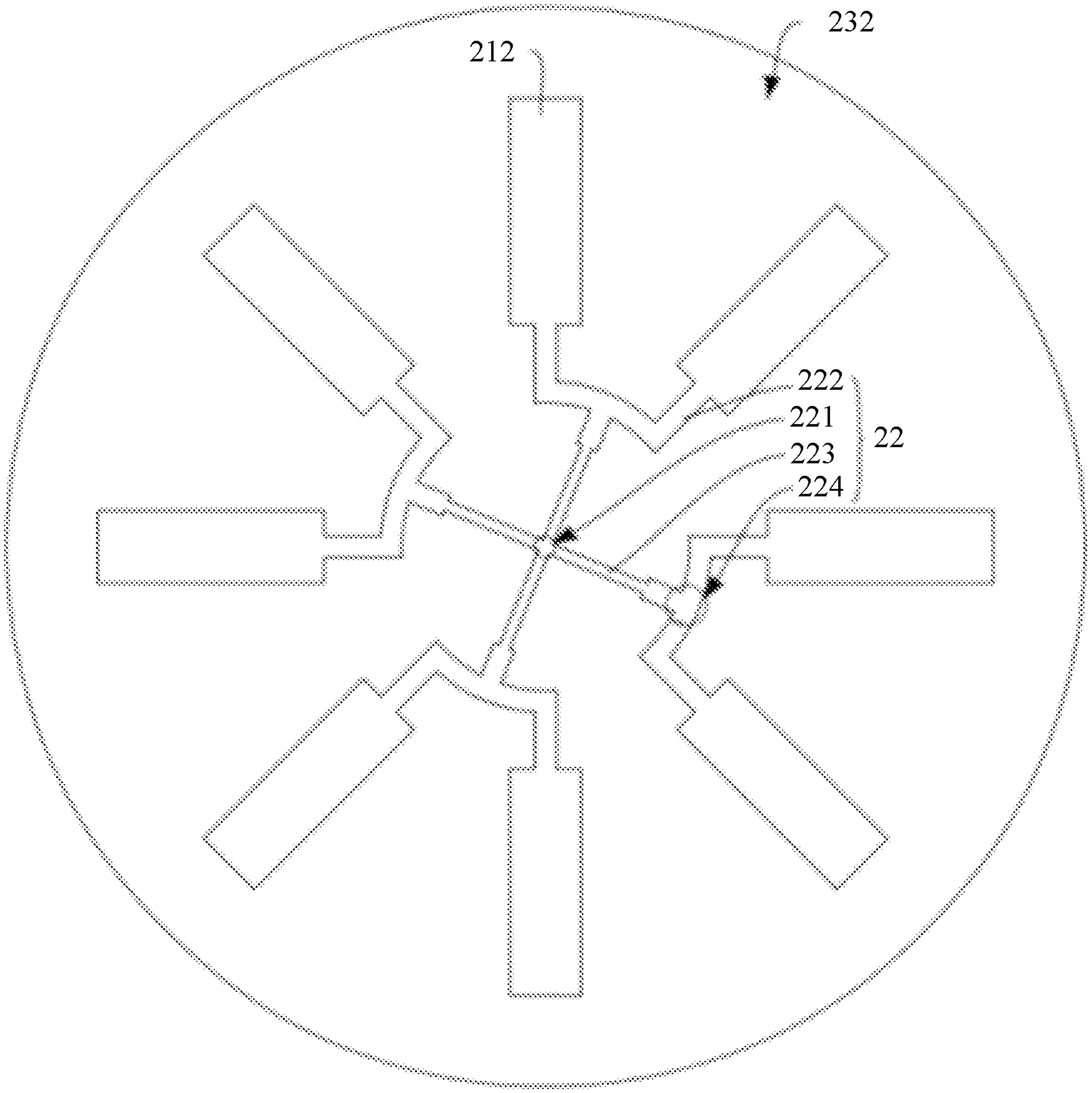
FIG. 13 is a schematic diagram of a plane that is of a lower part and that exists when a vertically polarized high-density antenna is a dipole antenna according to an embodiment.

The feeding part 22 forms a double-sided parallel microstrip line power division network. The feeding part 22 includes a part located on the upper surface 231, and the part is used to feed each upper dipole 211; and the feeding part 22 includes a part located on the lower surface 232, and the part is used to feed each lower dipole 212. FIG. 12 and FIG. 13 are schematic diagrams of planes of the upper surface 231 and the lower surface 232 in this embodiment. The feeding part 22 is used as a double-sided parallel microstrip line power division network, and an upper part and a lower part of the feeding portion 22 have a same shape. The upper dipole 211 and the lower dipole 212 may have a same shape. It can be understood that, in some other embodiments, the upper dipole 211 and the lower dipole 212 may alternatively have different shapes, or the upper dipole 211 and the lower dipole 212 may alternatively be distributed in a mirroring manner with respect to the feeding part 22.

FIG. 12 and FIG. 13 each shows a structure of the feeding part 22. The feeding part 22 may include a first power splitter 221, a plurality of ohm transmission lines 222, a plurality of impedance conversion lines 223, and a second power splitter 224. The second power splitter 224 may be a two-way power splitter, and the first power splitter 221 may be selected based on the quantity of dipoles 21. For example, in the example shown in FIG. 12, there are eight dipoles, and when the second power splitter 224 is a two-way power splitter, the first power splitter 221 may be a four-way power splitter. Therefore, eight feeding lines may be led from a feeding point of the feeding part 22 through the first power splitter 221 and the second power splitter 224, to feed the eight dipoles 21 respectively. The first power splitter 221 of the feeding part 22 may be located at the antenna phase center.

For example, as shown in FIG. 12, four output ends of the first power splitter 221 may be connected to four impedance conversion lines 223, and the other end of each impedance conversion line 223 is connected to one end of one ohm transmission line 222. The impedance conversion line 223 may be used to implement impedance matching between the ohm transmission line 222 and the first power splitter 221. The other end of each ohm transmission line 222 is connected to one second power splitter 224. Two output ends of the second power splitter 224 each are connected to one upper dipole 211. Therefore, after dividing one path of current input into the feeding part 22 into four paths, the first power splitter 221 may output the four paths of currents through the four output ends. The four paths of currents are respectively transmitted to four second power splitters 224 through the four impedance conversion lines 223 and four ohm transmission lines 222 connected to the four impedance conversion lines 223, and each second power splitter 224 may divide a received current into two paths, and respectively output the two paths of currents to two adjacent upper dipoles 211, to feed the two adjacent upper dipoles 211.

In an embodiment, the impedance conversion line 223 may be a ¼ wavelength impedance conversion line, and the ohm transmission line 222 may be a 50 ohm microstrip line. However, on the lower surface 52 shown in FIG. 13, the structure of the feeding part 22 is also similar to that on the upper surface 51 shown in FIG. 12, and a current is respectively transferred to each lower dipole 22. Details are not described herein.

In FIG. 11 to FIG. 13, only an example in which N is 8 is used for description. For another case in which N is an even number, refer to the foregoing examples. A difference is that when N is a different even number, the feeding part 22 includes a different first power splitter 221, and the feeding part 22 also includes different quantities of impedance conversion lines 223 and different quantities of ohm transmission lines 222. For example, when N is 6, a first power splitter in an upper surface network and a first power splitter in a lower surface network may be three-way power splitters. Correspondingly, the first power splitter may be connected to three impedance conversion lines 223, the three impedance conversion lines 223 are connected to three ohm transmission lines 222, each ohm transmission line 222 is connected to one two-way second power splitter 224, and each second power splitter 224 may be connected to two upper dipoles 211 or lower dipoles 212.

Figure 14:
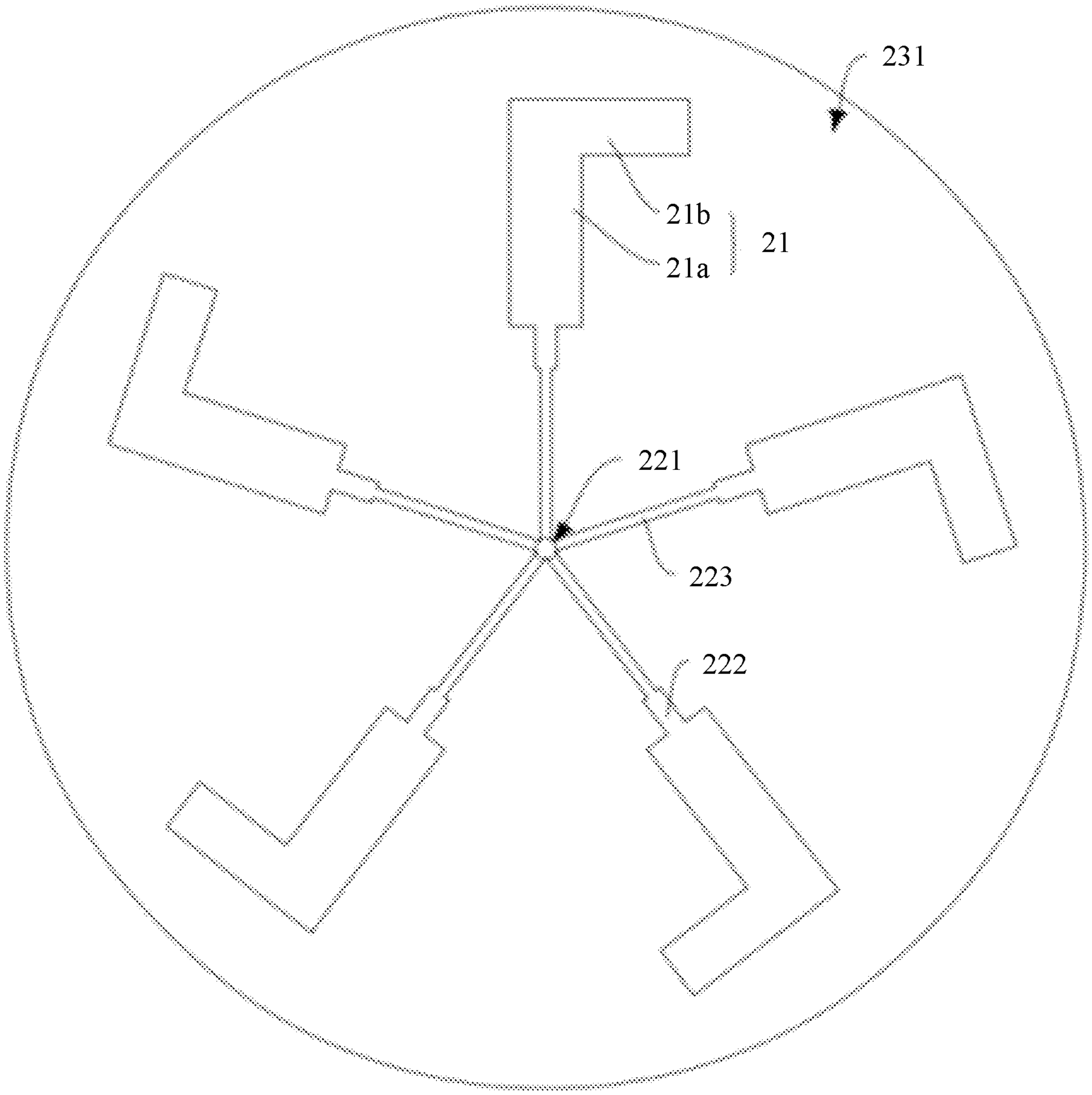
FIG. 14 is a schematic diagram of a plane that is of an upper part and that exists when another vertically polarized high-density antenna is a dipole antenna according to an embodiment.

It can be understood that when N is an odd number, refer to FIG. 14. A feeding part 22 located on the upper surface 231 of the circuit board 23 may include one first power splitter 221, a plurality of impedance conversion lines 223, and a plurality of ohm transmission lines 222. As shown in FIG. 14, that N is 5 is used as an example. The first power splitter 221 may be a five-way power splitter, the first power splitter 221 may be connected to five impedance conversion lines 223, the other end of each impedance conversion line 223 is connected to one ohm transmission line 222, and a tail end of each ohm transmission line 222 may be connected to one upper dipole 211 (which is identified as a dipole 21 in FIG. 14). Correspondingly, a feeding part 22 located on the lower surface 232 of the circuit board 23 has a same structure as the upper surface 231, and each lower dipole 212 is also connected to one end of one ohm transmission line 222 on the lower surface 232.

For example, FIG. 14 also shows a structure in which the dipole 21 is L-shaped. As shown in FIG. 14, the L-shaped dipole 21 has a radial part 21*a* and a non-radial part 21*b*, and the radial part 21*a* points to the antenna phase center. The non-radial part 21*b* may be approximately disposed perpendicular to the radial part 21*a*. FIG. 14 shows merely a possible implementation of the dipole 21 provided in this embodiment. In some other possible implementations, the dipole 21 may alternatively be of another shape, for example, any shape such as a trapezoidal shape, a bent structure, a T-shape, or a Y-shape.

Figure 15:
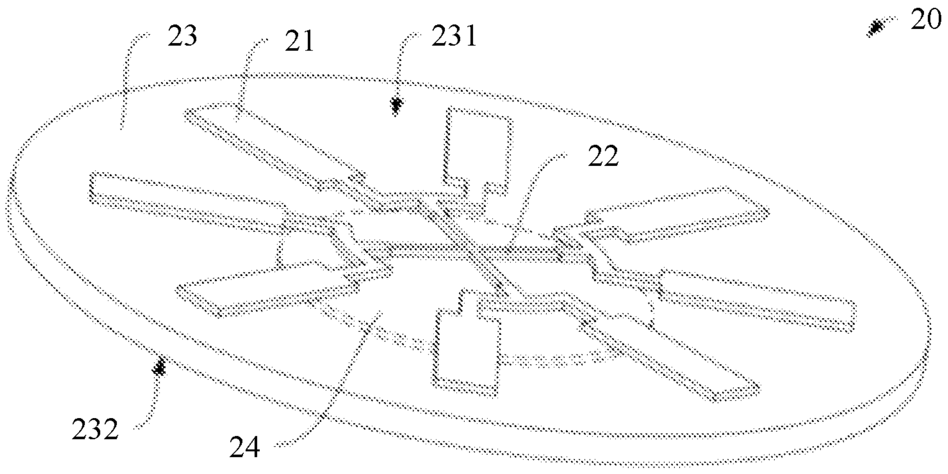
FIG. 15 is a schematic diagram of a structure in which a vertically polarized high-density antenna is a monopole antenna according to an embodiment.

For example, FIG. 15 shows a structure in which the vertically polarized high-density antenna 20 is a monopole antenna. As shown in FIG. 15, the vertically polarized high-density antenna 20 includes eight dipoles 21, a feeding part 22, a grounding part 24, and a circuit board 23. The eight dipoles 21 are all located on the upper surface 231 of the circuit board 23, and the feeding part 22 is also located on the upper surface 231. The grounding part 24 is located on the lower surface 232 of the circuit board 23. In the illustrated embodiment, the grounding part 24 is annular.

Figure 16:
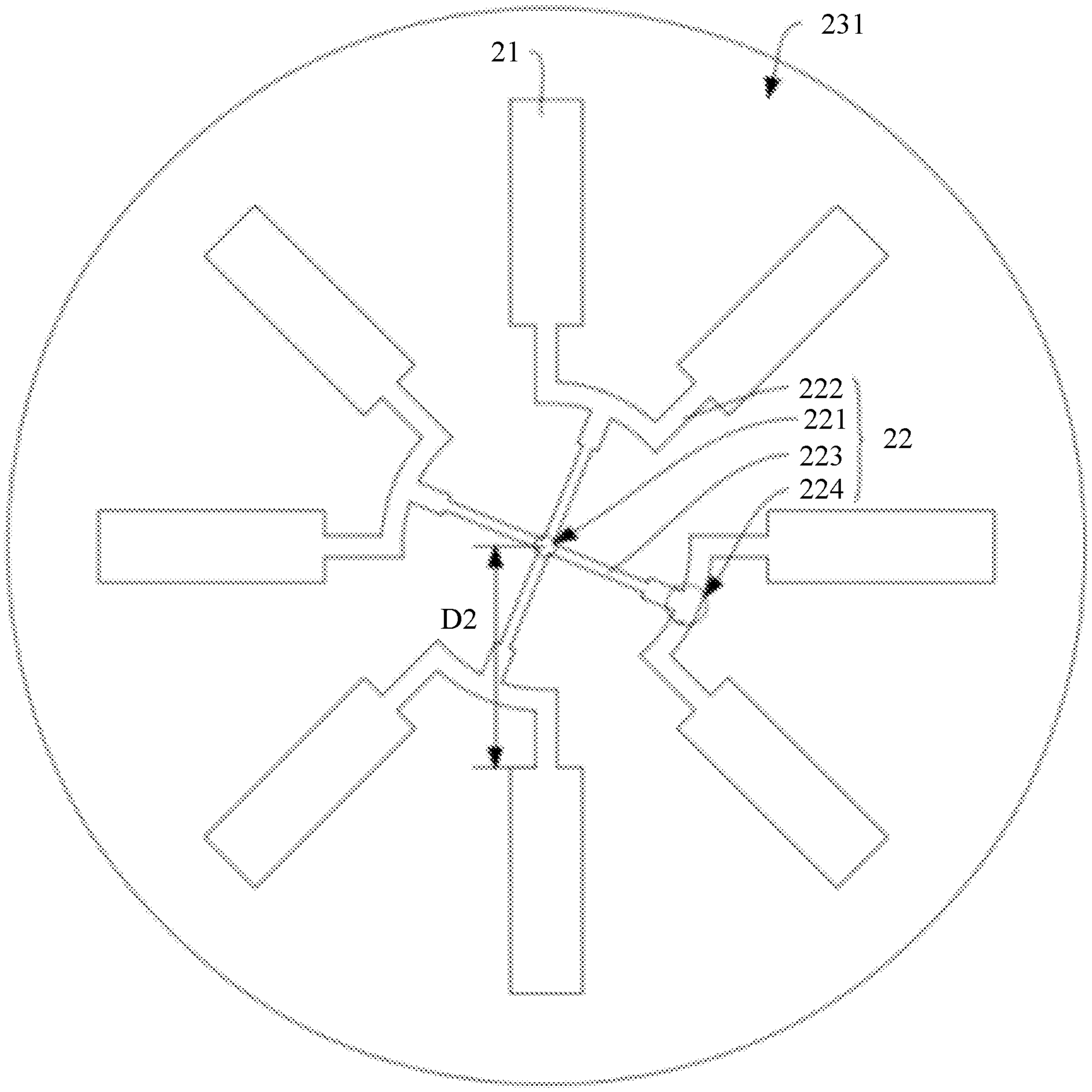
FIG. 16 is a schematic diagram of a plane that is of an upper part and that exists when a vertically polarized high-density antenna is a monopole antenna according to an embodiment.

With reference to FIG. 16, in this embodiment, the feeding part 22 may also include a first power splitter 221, a plurality of ohm transmission lines 222, a plurality of impedance conversion lines 223, and a second power splitter 224. A structure of the feeding part is similar to that shown in FIG. 12, and the second power splitter 224 is connected to each dipole 21. For specific settings of the feeding part 22 and the dipole 21, refer to related descriptions in FIG. 12 to FIG. 14. Details are not described herein again. The grounding part 24 forms an inner conductor of the monopole antenna, to improve radiation efficiency of each dipole 21. In an embodiment, the grounding part 24 is also located at a center of a projection 20' of the vertically polarized high-density antenna 20, and the grounding part 24 and a projection of each dipole 21 are flush or has a gap.

In this embodiment, when the plurality of dipoles 21 are arranged in a circle, a nearest distance D2 between each dipole 21 and the antenna phase center may be adjusted, to further adjust an azimuth of the vertically polarized high-density antenna 20, in other words, adjust a coverage area of the vertically polarized high-density antenna 20 in a horizontal direction. For example, a distance D2 between a single dipole 21 and the antenna phase center meets a condition: $\frac{1}{8}\lambda \leqslant D2 \leqslant \frac{1}{2}\lambda$.

Figure 17:
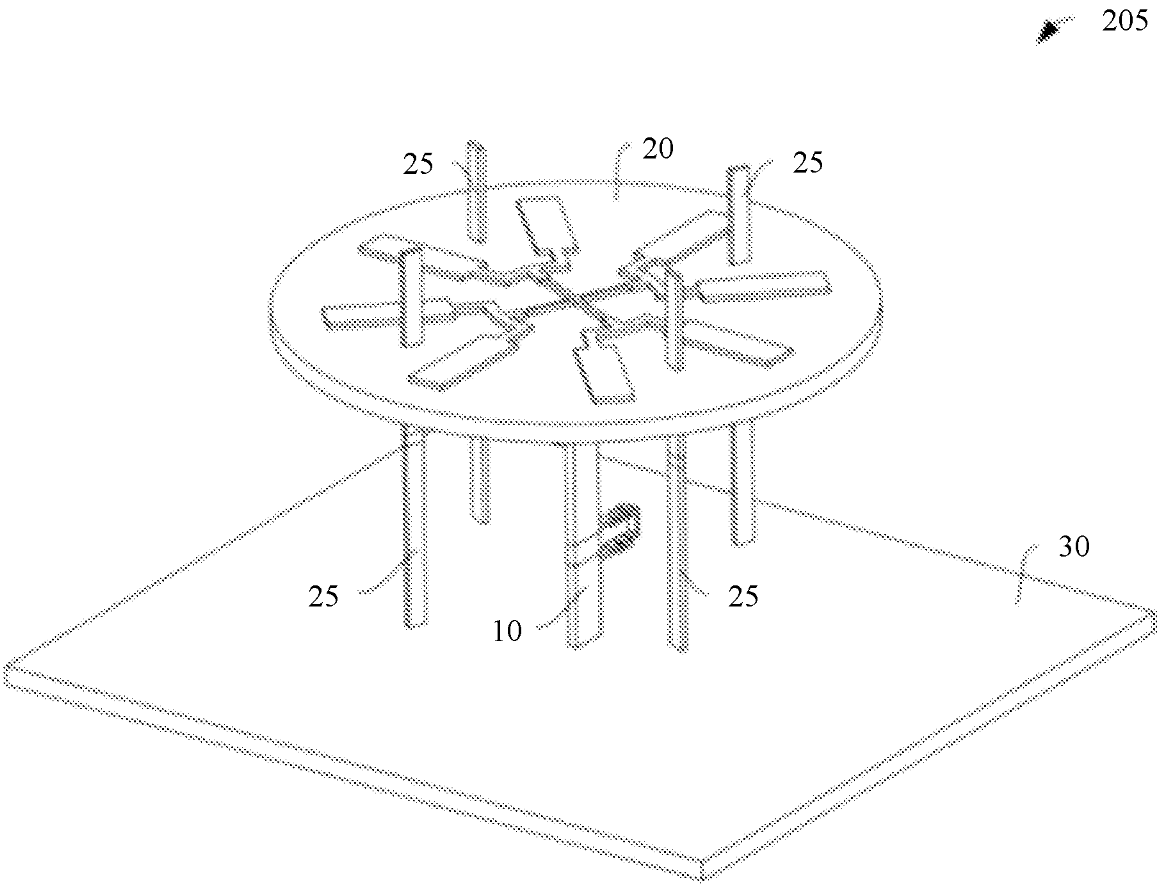
FIG. 17 is a schematic diagram of a structure of another reconfigurable antenna according to an embodiment.

Referring to the embodiment in FIG. 17, the vertically polarized high-density antenna 20 may be further provided with a plurality of azimuth reflectors 25. The plurality of azimuth reflectors 25 are also distributed in a circle, and a maximum of one azimuth reflector 25 is disposed between two adjacent dipoles 21. A length direction of the azimuth reflector 25 passes through a plane on which the plurality of dipoles 21 are located. In other words, the azimuth reflector 25 may be disposed parallel to the polarization direction of the vertically polarized high-density antenna 20. Simultaneously referring to FIG. 18, the azimuth reflector 25 includes a first reflection section 251 and a second reflection section 252 in the length direction of the azimuth reflector 25. The first reflection section 251 is located on a side that is of the dipole 21 and that is away from the bottom plate 30, and the second reflection section 252 is located between the dipole 21 and the bottom plate 30.

Figure 19:
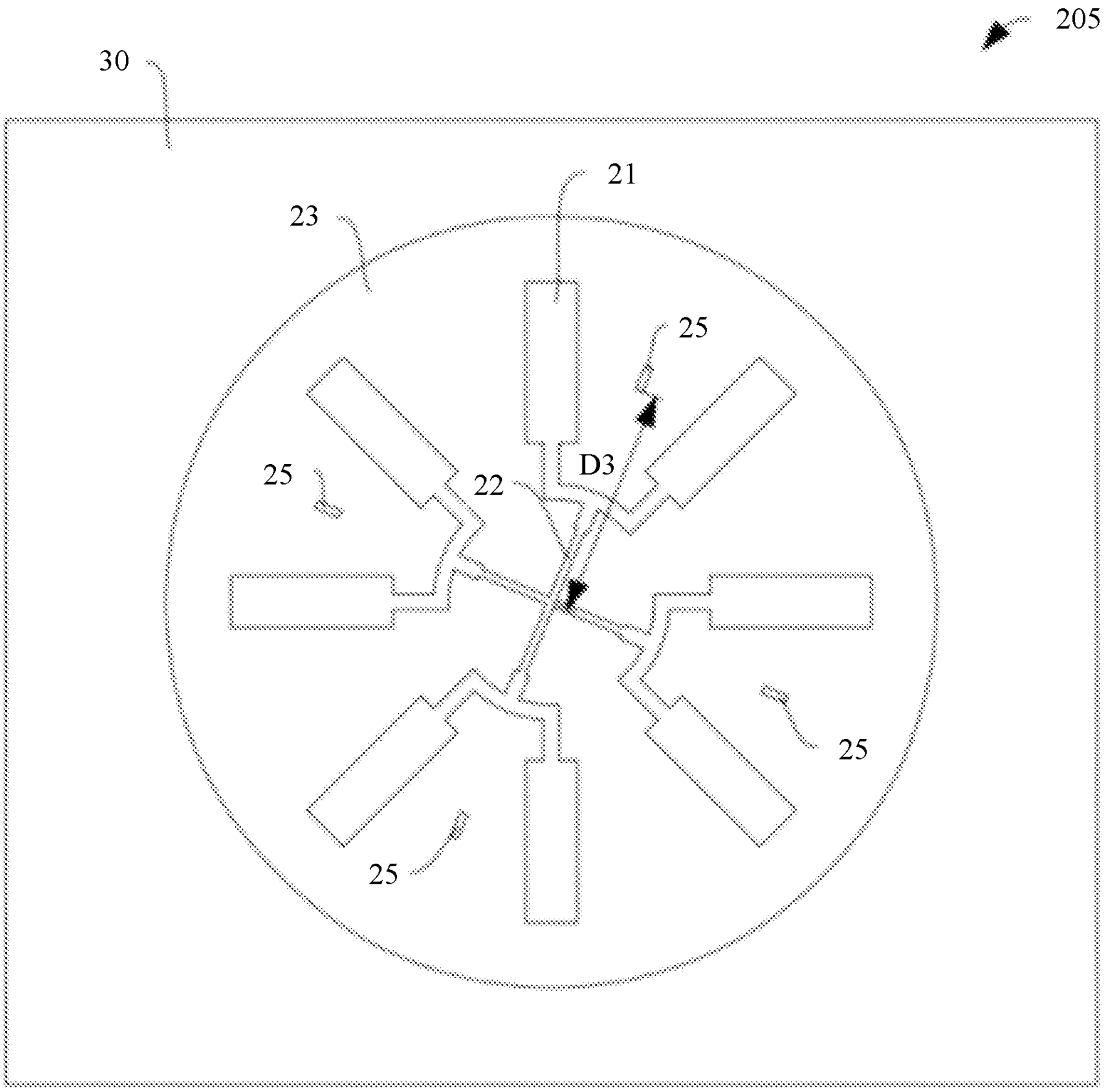
FIG. 19 is a schematic diagram of a structure of a plane of a reconfigurable antenna according to an embodiment.

Further refer to FIG. 19 for understanding. In the schematic diagram of FIG. 19, there are four azimuth reflectors 25, and the four azimuth reflectors 25 are also evenly distributed in a circle, and each azimuth reflector 25 is located between two adjacent dipoles 21. The four azimuth reflectors 25 are paired, and each pair of azimuth reflectors 25 is symmetrically distributed with respect to the antenna phase center. The azimuth reflector 25 may reflect a signal beam in the horizontal direction of the vertically polarized high-density antenna 20, and the azimuth reflectors 25 are disposed at intervals, so that the radiation pattern of the vertically polarized high-density antenna 20 is even, and a radiation capability of the vertically polarized high-density antenna 20 in the range of 360 degrees in the horizontal direction is improved.

In an embodiment, a distance D3 between a single azimuth reflector 25 and the antenna phase center is greater than or equal to the distance D2 between the dipole 21 and the antenna phase center, and is less than or equal to a maximum distance between the dipole 21 and the antenna phase center. In other words, D3 meets a condition: $D2 \leqslant D3 \leqslant (D2+L2)$. It may also be described as follows: A projection of the azimuth reflector 25 on the bottom plate 30 is located within an annular region enclosed by the dipoles 21. Therefore, the azimuth reflector 25 can reflect the signal beam of the vertically polarized high-density antenna 20 in the horizontal direction, and control a horizontal coverage area of the vertically polarized high-density antenna 20 to be small.

Refer to FIG. 18 again. The azimuth reflector 25 has a length L3 in the polarization direction of the azimuth reflector 25. In an embodiment, the length L3 of the azimuth reflector 25 is further controlled to meet a condition: $\frac{1}{5}\lambda \leqslant L3 \leqslant \lambda$, to ensure a distance in which the azimuth reflector 25 performs an action on the signal beam. In addition, on a side that is of the azimuth reflector 25 and that is close to the bottom plate 30, namely, on a side of the second reflection section 252 of the azimuth reflector 25, the azimuth reflector 25 and the bottom plate 30 are further disposed by being spaced from each other, and it may be set that a spacing distance D4 meets a condition: $D4 \leq \frac{1}{4}\lambda$. The azimuth reflector 25 and the bottom plate 30 are spaced from each other, to avoid too long distance in which the azimuth reflector 25 performs an action, causing a too large coverage area of the vertically polarized high-density antenna 20 in the horizontal direction. It can be understood that, in the embodiment in which the vertically polarized high-density antenna 20 includes the circuit board 23, the azimuth reflector 25 may be fastened to the circuit board 23, and the azimuth reflector 25 is disposed by being spaced from the bottom plate 30. However, when the vertically polarized high-density antenna 20 is of a sheet metal structure, the vertically polarized high-density antenna 20 does not include the circuit board 23, the azimuth reflector 25 may also be fastened to the bottom plate 30, and the azimuth reflector 25 and the bottom plate 30 need to be isolated from each other.

Figure 18:
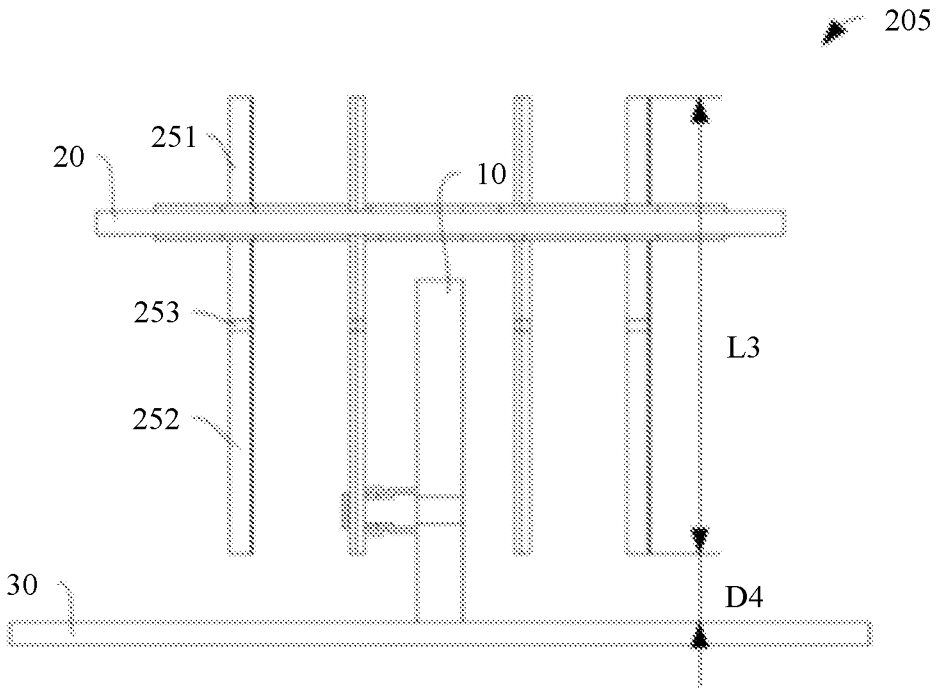
FIG. 18 is a schematic diagram of a structure of a side surface of a reconfigurable antenna according to an embodiment.

In the schematic diagram of FIG. 18, the azimuth reflector 25 is also provided with an azimuth switch 253. The azimuth switch 253 may also be used to switch the azimuth reflector 25 between an off state and an operating state. It can be understood that, that the control circuit 203 controls the operating mode of the reconfigurable antenna 205 may further include: The control circuit 203 controls the azimuth switch 253. Specifically, when each azimuth switch 253 on each reflector 25 is in an operating state, the vertically polarized high-density antenna 20 may be in the omnidirectional mode. In this case, coverage areas of the vertically polarized high-density antennas 20 in the range of 360 degrees in the horizontal direction tend to be consistent based on the antenna phase center. However, as mentioned above, when a distance between access points 102 is large, the reconfigurable antenna 205 may further implement signal coverage in a super-large-angle directional mode. In this case, only azimuth switches 253 of two adjacent azimuth reflectors 25 may be controlled to be in an operating state, and the other azimuth switches 253 are in an opened state, so that the vertically polarized high-density antenna 20 is in the directional mode.

Figure 20:
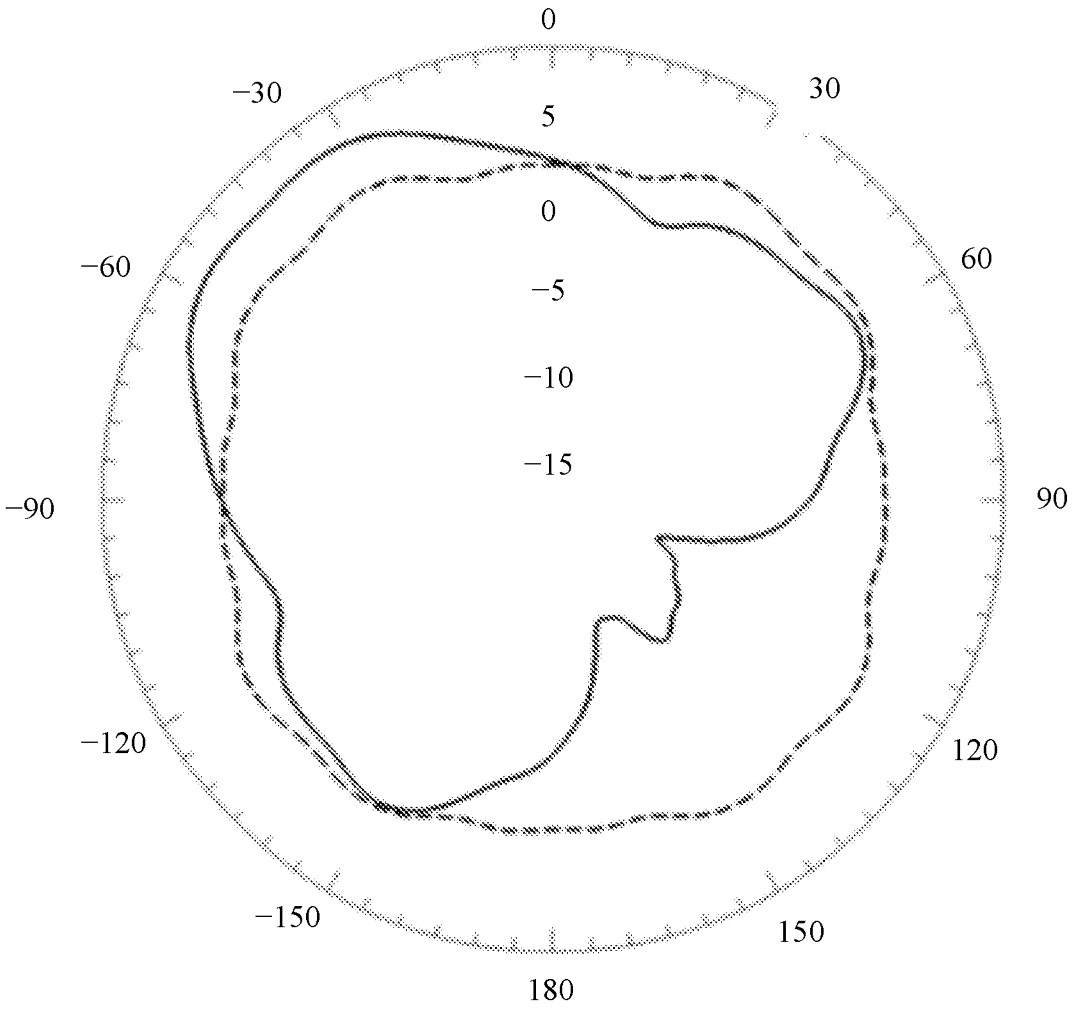
FIG. 20 is a schematic diagram of simulation results in a horizontal direction that exist when a vertically polarized high-density antenna of a reconfigurable antenna is in different operating modes according to an embodiment.

Refer to the schematic diagram of FIG. 20, when the vertically polarized high-density antenna 20 is in the omnidirectional mode (which is shown by using a solid line in FIG. 20), a coverage area of the vertically polarized high-density antenna 20 in the range of 360 degrees is even. However, when the vertically polarized high-density antenna 20 is in the directional mode, as shown by a dashed line in the figure, a gain increase of 2 decibels of the vertically polarized high-density antenna 20 in a 315-degree direction is achieved, and a signal coverage area in the direction is wider. However, two adjacent azimuth switches 253 have different locations, and a wider directional coverage area of the vertically polarized high-density antenna 20 in a 45-degree, 135-degree, or 225-degree direction is achieved. It can be understood that, under control of the operating state of the controllable reflector 10 in the reconfigurable antenna 205, a pitch angle of the reconfigurable antenna 205 in the directional mode may also be correspondingly adjusted, and a gain of 1 decibel to 2.5 decibels is realized at a preset angle, to obtain a greater signal coverage area in the directional mode.

Refer to FIG. 6*c* again. In this implementation, when the vertically polarized high-density antenna 20 is in the directional mode, as shown by a dashed line in FIG. 6*c*, the signal coverage area of the vertically polarized high-density antenna 20 may be extended to a range with a radius of 15 m. It can be understood that a coverage area in the directional mode may also be adjusted based on a scenario requirement. A maximum coverage area of the reconfigurable antenna 205 may alternatively exceed the range of the radius of 15 m or smaller than the range of the radius of 15 m.

It should be noted that the schematic diagram of FIG. 20 is described based on an embodiment in which there are four azimuth reflectors 25, and the four azimuth reflectors 25 are evenly distributed in a circle. In some other embodiments, the four azimuth reflectors 25 may alternatively be distributed in an uneven manner, and corresponding directional coverage angles are adjusted correspondingly. Alternatively, for the reconfigurable antenna 205, another quantity of azimuth reflectors 25 may alternatively be disposed based on a use requirement, and operating states of different azimuth reflectors 25 cooperate, to implement directional coverage effects of different quantities of azimuth reflectors 25 at different angles.

In the schematic diagram of FIG. 18, the azimuth switch 253 may alternatively be located at a midpoint of the azimuth reflector 25 in the polarization direction of the vertically polarized antenna 20. A location of the azimuth switch 253 is set, to control a difference in horizontal radiation patterns of the azimuth reflector 25 between the off state and the operating state. To be specific, when the azimuth switch 253 is disposed at a midpoint location of the azimuth reflector 25, a coverage area that is of the reconfigurable antenna 205 in the horizontal direction and that exist when the azimuth reflector 25 is in the off state may have a larger difference from a coverage area that is in the horizontal direction and that exists when the azimuth reflector 25 is in the operating state, in other words, there is a larger change in the coverage area of the reconfigurable antenna 205 in different operating modes, to adapt to more different use scenario requirements.

What is claimed is:

1. A reconfigurable antenna comprising:

a bottom plate;

a vertically-polarized high-density antenna comprising a circuit board and a plurality of linearly-polarized conductive elements that are arranged in a geometric shape on the circuit board and having a phase center aligned at a center of the geometric shape; and a controllable reflector located between the bottom plate and the vertically-polarized high-density antenna and comprising a switch configured to enable a state of the controllable reflector to be an operating state or an off state, wherein a first projection of the controllable reflector on the bottom plate is at a center of a second projection of the vertically-polarized high-density antenna on the bottom plate.

2. The reconfigurable antenna of claim 1, wherein the controllable reflector further comprises a part parallel to a polarization direction of the vertically-polarized high-density antenna, wherein a distance D1 between the controllable reflector and the vertically-polarized high-density antenna meets an inequality $D1 \leq \frac{1}{4}\lambda$, and wherein $\lambda$ is a wavelength corresponding to an operating frequency band of the vertically-polarized high-density antenna.

3. The reconfigurable antenna of claim 2, wherein a length of the controllable reflector in the polarization direction is L1, and wherein L1 meets an inequality $\frac{1}{4}\lambda \leq L1 \leq \lambda$.

4. The reconfigurable antenna of claim 1, wherein in a polarization direction of the vertically-polarized high-density antenna, the controllable reflector comprises a first end that is proximate to the bottom plate and that is electrically connected to the bottom plate.

5. The reconfigurable antenna of claim 4, wherein the controllable reflector further comprises a second end opposite the first end, and wherein the switch is located closer to the first end than the second end.

6. The reconfigurable antenna of claim 1, wherein the controllable reflector further comprises an inductor structure connected in parallel with the switch to form a resonator, and wherein a resonance frequency of the resonator falls within an operating frequency band of the vertically-polarized high-density antenna.

7. The reconfigurable antenna of claim 1, further comprising a plurality of controllable reflectors that are evenly distributed, wherein the plurality of controllable reflectors comprises the controllable reflector.

8. The reconfigurable antenna of claim 1, wherein an angle corresponding to a maximum gain of the adjusted pitch angle of the reconfigurable antenna is 37.5 degrees(°).

9. The reconfigurable antenna of claim 1, wherein when the vertically-polarized high-density antenna is in a directional mode, a maximum gain of the reconfigurable antenna is 1-2.5 decibels (dB) greater when the controllable reflector is in the operating state than when the controllable reflector is in the off state.

10. The reconfigurable antenna of claim 1, wherein an angle corresponding to a maximum gain of the adjusted pitch angle of the reconfigurable antenna is 70 degrees (°) when the controllable reflector is in the operating state.

11. A network device comprising:
- a radio frequency circuit; and
- a reconfigurable antenna electrically connected to the radio frequency circuit and comprising:
  - a bottom plate;
  - a vertically-polarized high-density antenna comprising:
    - a first projection comprising a center;
    - a circuit board; and
    - a plurality of linearly-polarized conductive elements that are arranged in a geometric shape on the circuit board, wherein the plurality of linearly-polarized conductive elements comprises a phase center aligned at a center of the geometric shape; and
- a controllable reflector located between the bottom plate and the vertically-polarized high-density antenna and comprising a switch configured to enable a state of the controllable reflector to be an operating state or an off state,
- wherein a first projection of the controllable reflector on the bottom plate is at a second center of a second projection of the vertically-polarized high-density antenna on the bottom plate.

12. The network device of claim 11, wherein the controllable reflector further comprises a part parallel to a polarization direction of the vertically-polarized high-density antenna, wherein a distance D1 between the controllable reflector and the vertically-polarized high-density antenna meets an inequality $D1 \leq \frac{1}{4}\lambda$, and wherein $\lambda$ is a wavelength corresponding to an operating frequency band of the vertically-polarized high-density antenna.

13. The network device of claim 12, wherein a length of the controllable reflector in the polarization direction is L1, and wherein L1 meets an inequality $\frac{1}{4}\lambda \leq L1 \leq \lambda$.

14. The network device of claim 11, wherein in a polarization direction of the vertically-polarized high-density antenna, the controllable reflector comprises a first end that is proximate to the bottom plate and that is electrically connected to the bottom plate.

15. The network device of claim 14, wherein the controllable reflector further comprises a second end opposite the first end, and wherein the switch is located closer to the first end than the second end.

16. The network device of claim 11, wherein the controllable reflector further comprises an inductor structure connected in parallel with the switch to form a resonator, and wherein a resonance frequency of the resonator falls within an operating frequency band of the vertically-polarized high-density antenna.

17. The network device of claim 11, wherein an angle corresponding to a maximum gain of the adjusted pitch angle of the reconfigurable antenna is 37.5 degrees)(°) when the controllable reflector is in the off state and 70° when the controllable reflector is in the operating state.

18. The network device of claim 11, wherein when the vertically-polarized high-density antenna is in a directional mode, a maximum gain of the reconfigurable antenna is 1-2.5 decibels (dB) greater when the controllable reflector is in the operating state than when the controllable reflector is in the off state.

19. The network device of claim 11, wherein an angle corresponding to a maximum gain of the adjusted pitch angle of the reconfigurable antenna is 70 degrees)(°) when the controllable reflector is in the operating state.

20. The network device of claim 11, further comprising a plurality of controllable reflectors that are evenly distributed, wherein the plurality of controllable reflectors comprises the controllable reflector.

* * * * *